US005862551A

United States Patent [19]

Oguma et al.

[11] Patent Number: 5,862,551

[45] Date of Patent: Jan. 26, 1999

[54] BED APPARATUS

[75] Inventors: Yoshio Oguma, Tokyo; Akihiro Midorikawa, Abiko; Tetsuya Waku, Ageo, all of Japan

[73] Assignee: France Bed Co., Ltd., Tokyo, Japan

[21] Appl. No.: 736,709

[22] Filed: Oct. 28, 1996

[30] Foreign Application Priority Data

Nov. 10, 1995 [JP] Japan .................................. 7-292965

[51] Int. Cl.[6] .......................... A47B 9/00; A47C 17/04; A61G 7/018; F16B 7/00

[52] U.S. Cl. ........................ 5/618; 5/613; 5/616; 5/617; 5/288; 5/304; 403/231

[58] Field of Search .............................. 5/600, 613, 616, 5/617, 618, 658, 662, 282.1, 285, 286, 288, 304, 925, 926, 927, 186.1, 400, 411; 403/205, 403, 231

[56] References Cited

U.S. PATENT DOCUMENTS

| | | | |
|---|---|---|---|
| 583,657 | 6/1897 | Newman et al. | 5/304 |
| 822,682 | 6/1906 | Murphy | 5/304 |
| 984,879 | 2/1911 | Bartholome | 5/618 |
| 1,060,180 | 4/1913 | Governale et al. | 5/288 |
| 2,297,105 | 9/1942 | Laukhuff | 5/618 X |
| 2,400,155 | 5/1946 | Letschert et al. | 5/618 X |
| 2,651,785 | 9/1953 | Berner . | |
| 3,281,141 | 10/1966 | Smiley et al. | 5/618 X |
| 3,722,701 | 3/1973 | Malcik et al. | 403/231 X |
| 3,965,500 | 6/1976 | Stein, Jr. . | |
| 4,006,499 | 2/1977 | Young . | |
| 4,369,982 | 1/1983 | Hein et al. | 5/658 X |
| 4,425,673 | 1/1984 | Werner | 5/618 X |
| 4,678,171 | 7/1987 | Sanders et al. | 5/618 |
| 4,742,586 | 5/1988 | Galumbeck . | |
| 4,821,351 | 4/1989 | Bergenwall | 5/618 |
| 4,996,731 | 3/1991 | Kruyt | 5/618 |
| 5,438,723 | 8/1995 | Carroll | 5/618 X |
| 5,568,661 | 10/1996 | Bathrick et al. | 5/616 X |
| 5,608,932 | 3/1997 | Hasegawa | 5/600 X |
| 5,640,730 | 6/1997 | Godette | 5/617 X |

FOREIGN PATENT DOCUMENTS

| | | | |
|---|---|---|---|
| 2651978 | 3/1991 | France | 5/616 |
| 2509768 | 9/1976 | Germany | 403/231 |
| 3313843 | 10/1984 | Germany . | |
| 683070 | 11/1952 | United Kingdom . | |
| 1238456 | 7/1971 | United Kingdom | 5/618 |
| 1248469 | 10/1971 | United Kingdom | 5/400 |

*Primary Examiner*—Kenneth J. Dorner
*Assistant Examiner*—Robert G. Santos
*Attorney, Agent, or Firm*—John P. White; Cooper & Dunham LLP

[57] ABSTRACT

A bed frame is provided with a base plate. The base plate has a fixed base plate portion secured to the bed frame, a hip plate portion and a back plate portion sequentially and rotatively connected to an end of said fixed base plate portion and a first leg plate portion and a second leg plate portion sequentially and rotatively connected to another end. The back plate portion is arranged to be raised by a back elevating mechanism. When the back plate portion has been raised, the hip plate portion is moved in synchronization with the rotation in the raising direction. At this time, since the back plate portion is raised to make an angle larger than that of the hip plate portion, the hip of a user is not held between the fixed base plate portion and the back plate portion.

19 Claims, 15 Drawing Sheets

BED APPARATUS

BACKGROUND OF THE INVENTION

1. Field of the Invention

The present invention relates to a bed apparatus having a base plate, on which a mattress is placed, and which is arranged to be moved vertically to raise the upper half of the body of a user.

2. Description of the Related Art

A bed apparatus for a patient includes a so-called "reclining type bed apparatus" which is capable of facilitating a user whose strength has been declined to, for example, have a meal. The reclining-type bed apparatus has a structure formed such that a base plate disposed on a bed frame is divided into a plurality of plate sections in the lengthwise direction of the bed frame; and a portion of the plate sections corresponding to the upper half of the body of the user, that is, a back raising portion, is enabled to be reclined by a drive mechanism.

Therefore, when the back raising portion of the foregoing bed apparatus is moved upwards, a user facing upwards is able to raise the upper half of the body without using power.

When the back raising portion is moved upwards in a pivotal manner, the mattress placed on the base plate is bent while pressing the back side of the user. Since the mattress has a predetermined thickness, compressive force is generated in the upper portion of the inner portion of the mattress in a lengthwise direction toward the inside portion thereof when the mattress is bent by raising the back raising portion. On the other hand, tension is generated in the lengthwise direction in the lower portion of the mattress which is the outer surface of the bent mattress.

Therefore, also the compressive force generated in the upper portion of the mattress acts on the back of the user whose upper half of the body is raised while being pressed by the top surface of the mattress. Therefore, the back is pressed downwards by the compressive force and thus the hip and the femoral region are pressed rearwards (in a direction toward the back raising portion). As a result, the hip is held by the mattress and pressed excessively.

If the user is strong enough to raise the back from the top surface of the mattress to remove the compressive force acting on the back, no problem arises. However, if the user is too weak to remove the compressive force, the user feels a pain.

SUMMARY OF THE INVENTION

In view of the foregoing, an object of the present invention is to provide a bed apparatus capable of eliminating an indisposition and pain of a user by forming the structure such that the compressive force generated in the upper portion of the mattress when the mattress is raised does not easily act on the back of a user.

According to one aspect of the present invention, there is provided a reclining type bed apparatus capable of raising the upper half of the body of a user, comprising:

a bed frame;

a base plate divided into a fixed base plate portion, a hip plate portion, a back plate portion and leg plate portions and structured such that the fixed base plate portion is secured to the bed frame, the hip plate portion and the back plate portion are sequentially and rotatively connected to one side of the fixed base plate portion and the leg plate portions are rotatively connected to another side of the fixed base plate portion; and a rear portion elevation mechanism for synchronously moving the hip plate portion by raising or lowering the back plate portion so that the back plate portion is raised at an angle bent forwards in the raising direction larger than an angle of the hip plate portion by raising the back plate portion.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

A first embodiment of the present invention will now be described with reference to FIGS. 1 to 19.

Figure 1:
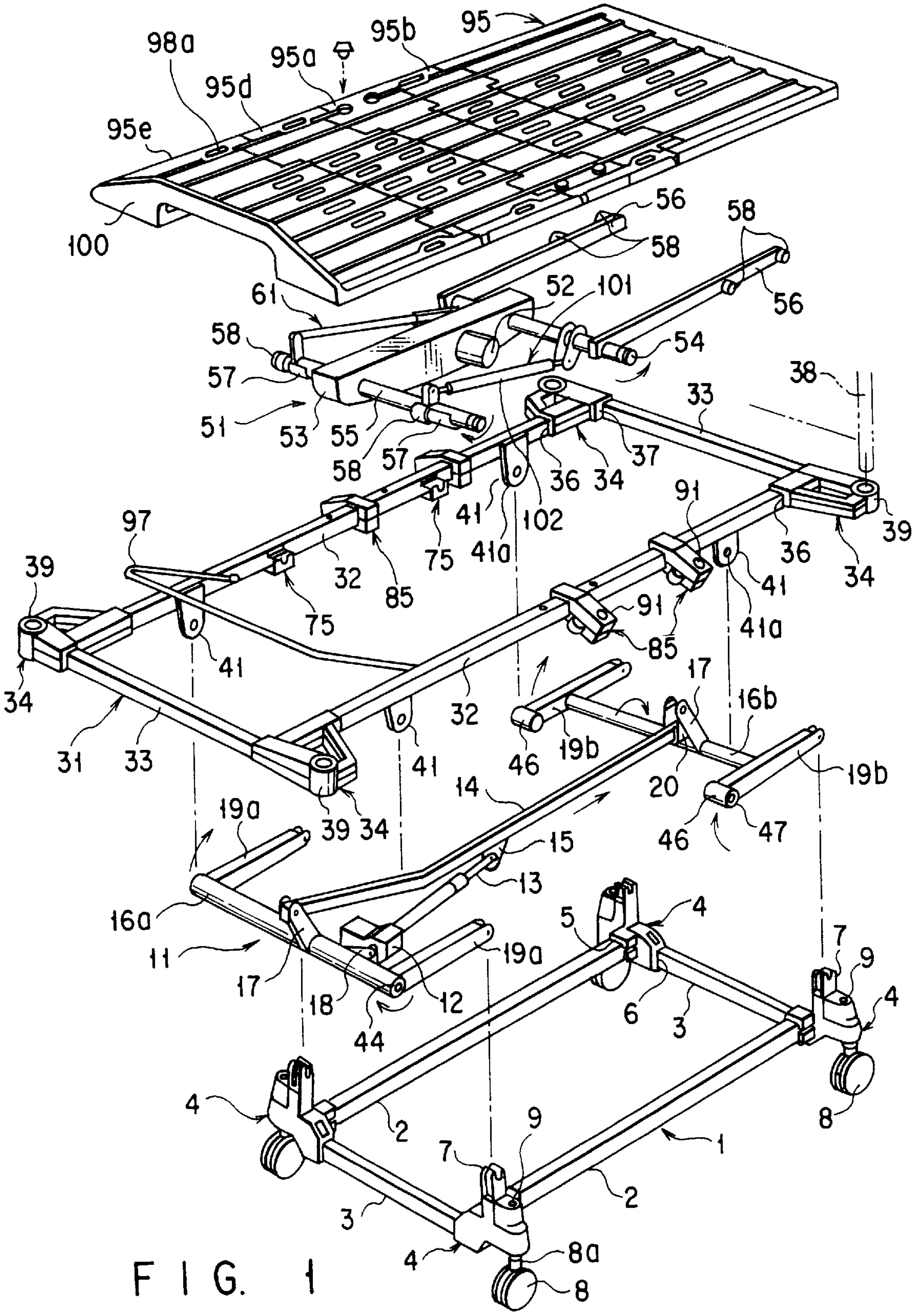
FIG. 1 is an exploded perspective view of a bed apparatus according to a first embodiment of the present invention.

FIG. 1 is an exploded perspective view of a reclining type bed apparatus having a base frame 1. The base frame 1 is formed by a pair of long frames 2 and short frames 3 disposed in a rectangular configuration and connected by first connection members 4 at the adjacent ends thereof. The long frame 2 and short frame 3 are square pipe members.

Figure 5:
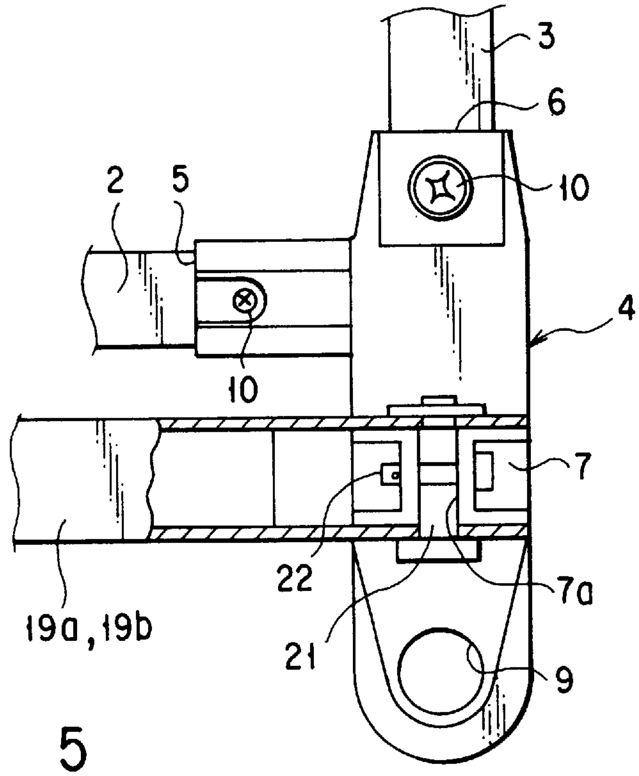
FIG. 5 is a plan view of a first connection member of the bed apparatus.
Figure 6:
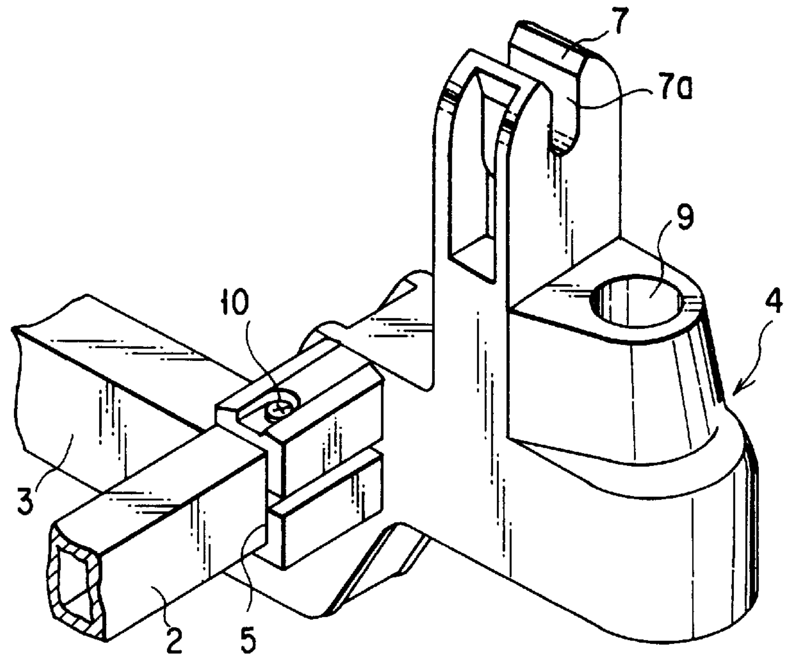
FIG. 6 is a perspective view of the first connection member.

The first connection member 4 is, as shown in FIGS. 5 and 6 and by aluminum dicast, formed by integrating a first insertion portion 5 into which an end of the long frame 2 is inserted, a second insertion portion 6 into which an end of the short frame 3 is inserted, an attaching portion 7 of a elevation mechanism 11 to be described later and formed to rotatively support second arms 19*a* and 19*b*, and an attaching hole 9 into which an attaching shaft 8*a* of a caster 8 having a stopper is inserted and secured, the attaching shaft 8*a* having the stopper which is capable of holding the base frame 1 in such a manner that the base frame 1 can be moved and the same can be held to inhibit the movement of the base frame 1. As a result, the long frame 2 and short frame 3 can be connected to form the rectangular shape. Note that the ends of the long frames 2 and the short frame 3 inserted into the insertion portions 5 and 6 are secured by screws 10.

The foregoing elevation mechanism 11 is provided for the base frame 1. The elevation mechanism 11 has a power source 12, as shown in FIG. 1. A drive shaft 13 is attached to the power source 12, the drive shaft 13 being arranged to be moved in the axial direction by the power source 12.

The leading end of the drive shaft 13 is, through a first bracket 15, movably supported at an intermediate portion of the synchronous rod 14. An end of the synchronous rod 14 and another end of the synchronous rod 14 respectively are movably supported by first arms 17 respective provided at intermediate portions of the rotational shafts 16*a* and 16*b*. A second bracket 18 is disposed at an intermediate portion of one of the first arms 17 to make a predetermined angle from the first arms 17 in the circumferential direction of the rotational shaft 16*a*. The power source 12 is rotatively attached to the second bracket 18. Note that an end of the synchronous rod 14 is movably supported through a synchronous member 20 with respect to the first arms 17.

An end of each of the second arms 19*a* is secured to the two ends of one of the rotational shafts 16*a*, while an intermediate portion of an another set of second arms 19*b* is secured to the two ends of the other rotational shaft 16*b*. As shown in FIG. 5, a support shaft 21 is provided for another end of each of the second arms 19*a* and 19*b*. The support shaft 21 is inserted into a groove portion 7*a* formed by opening the top end portion of an attaching portion 7 formed in the first connection member 4.

A stopper pin 22 is provided at the opened end of the attaching portion 7 in a direction traversing the groove portion 7*a*. The stopper pin 22 inhibits separation of the support shaft 21 from the groove portion 7*a*.

With the elevation mechanism 11 having the above-mentioned structure, when the power source 12 is turned on so that the drive shaft 13 is moved in the projecting direction, the synchronous rod 14 is moved in a direction indicated by an arrow shown in FIG. 1. As a result, the pair of the rotational shafts 16*a* and 16*b* are rotated clockwise as indicated by arrows shown in FIG. 1. When the rotational shafts 16*a* and 16*b* are rotated, the second arms 19*a*, 19*b* are synchronized with the rotation above.

An elevating frame 31 arranged to be moved vertically by the elevation mechanism 11 is disposed above the base frame 1. The elevating frame 31 is, similarly to the base frame 1, formed by disposing two long rods 32 and short rods 33 in the form of a rectangular shape such that their adjacent ends are connected to each other by second connection members 34.

Figure 8:
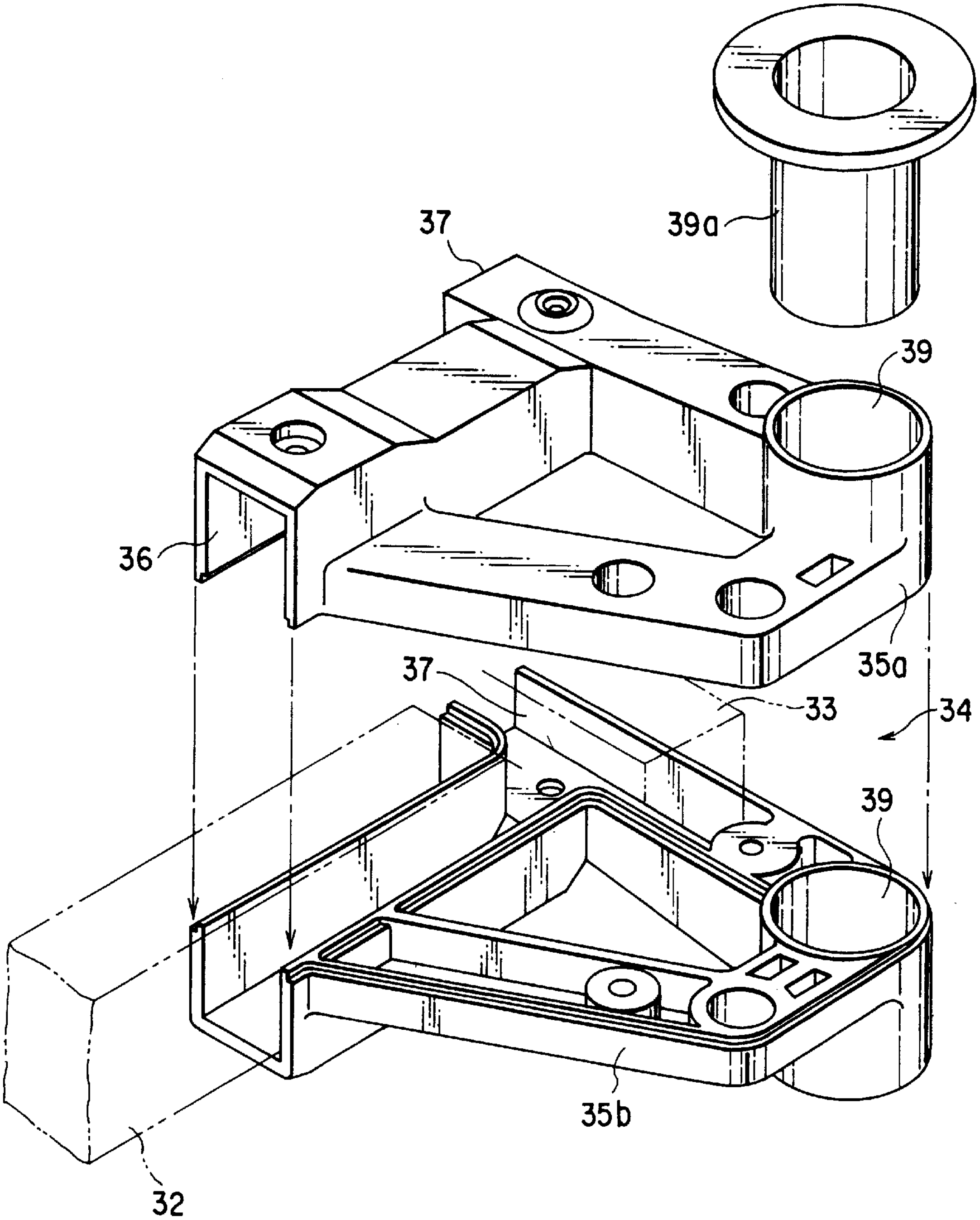
FIG. 8 is an exploded perspective view of a second connection member.

The second connection member 34 is formed into a rectangular shape divided into an upper member 35*a* and a lower member 35*b*, as shown in FIG. 8. By joining and securing the members 35*a* and 35*b* by screws or the like, the second connection member 34 is formed. The second connection member 34 has a first insertion portion 36 into which the long rod 32 is inserted and a second insertion portion 37 which is disposed perpendicular to the first insertion portion 36 and into which the short rod 33 is inserted.

The second connection members 34 each having the above-mentioned structure project over the two widthwise ends of the elevating frame 31. A holding hole 39 serving as a holding portion into which the lower end of each of a head board 37*a* and a foot board 38*a* (shown in FIG. 3) is inserted and held through a cap 39*a* having a flange is formed in the end portion of the projection portion of the second connection member 34. That is, the two widthwise ends of each of the boards 37*a* and 38*a* are inserted and held in the holding holes 39 of the pair of the second connection members 34 formed in the two widthwise ends of the elevating frame 31.

As shown in FIG. 1, third brackets 41 are suspended from the inner surface of each long rod 32 of the elevating frame

Figure 7:
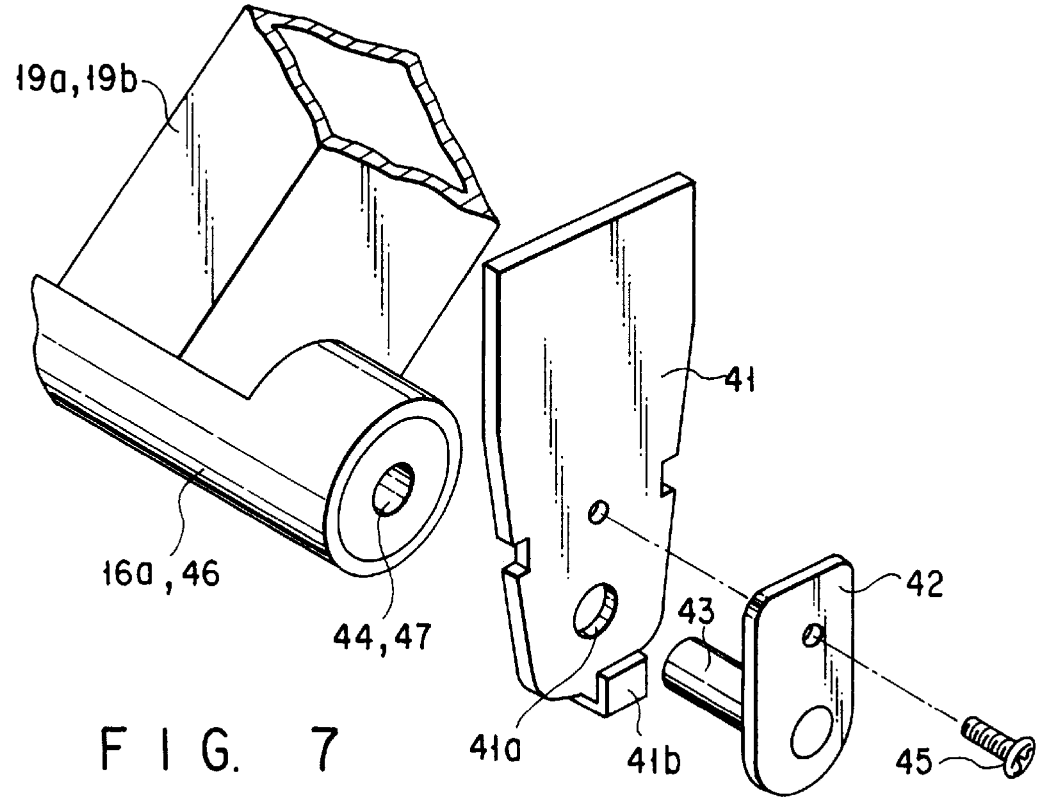
FIG. 7 is an exploded perspective view of a structure for connecting a vertical moving mechanism and a vertical frame.

31. Each of the third bracket 41 has a through hole 41*a*, as shown in FIG. 7. A support shaft 43 projecting over a pressing plate 42 is inserted into the through hole 41*a*. The support shaft 43 is inserted into a support hole 44 formed in an end portion of the rotational shaft 16*a* and a support hole 47 of a pipe member 46 formed in an end portion of the rotational shaft 16*b*.

The pressing plate 42 is secured to the third bracket 41 by a screw 45. An L-shape engaging member 41*b* arranged to be engaged to the lower end of a pressing plate 42 is formed at the lower end of the third bracket 41.

The elevating frame 31 has a back elevating mechanism 51 shown in FIG. 1. The back elevating mechanism 51 has an elongated box 53 having a drive motor 52 on one side thereof. A first rotational shaft 54 (a drive shaft) is disposed at a lengthwise end of the box 53, while a second rotational shaft 55 is disposed at another end of the same. The box 53 includes a power transmission mechanism (not shown) for transmitting rotations of the drive motor 52 to the first rotational shaft 54. When the drive motor 52 is rotated, the first rotational shaft 54 is rotated counterclockwise as indicated by an arrow shown in FIGS. 1 and 11A.

The ends of a pair of first raising arms 56 are secured to the two ends of the first rotational shaft 54, while ends of a pair of second raising arms 57 are secured to the two ends of the second rotational shaft 55. Two rollers 58 are, apart from a predetermined distance, rotatively disposed to another end of the first raising arm 56, while one of the rollers 58 is rotatively disposed to another end of the second raising arm 57.

Figure 11A:
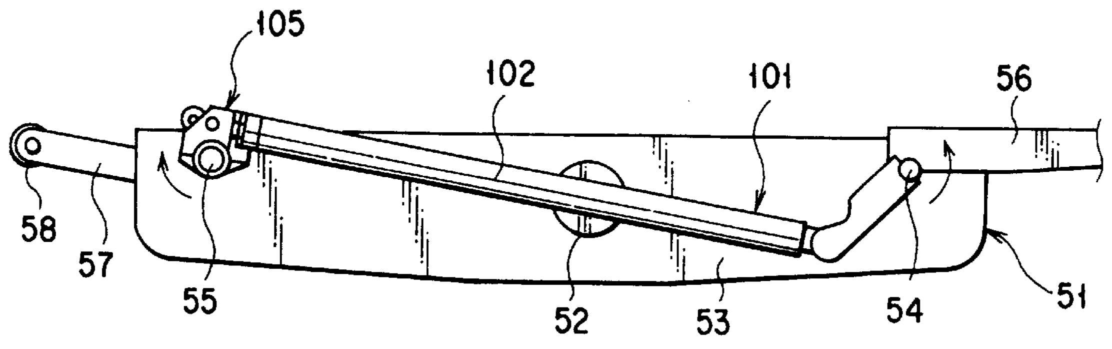
FIG. 11A is a front view showing a back raising drive mechanism.
Figure 11B:
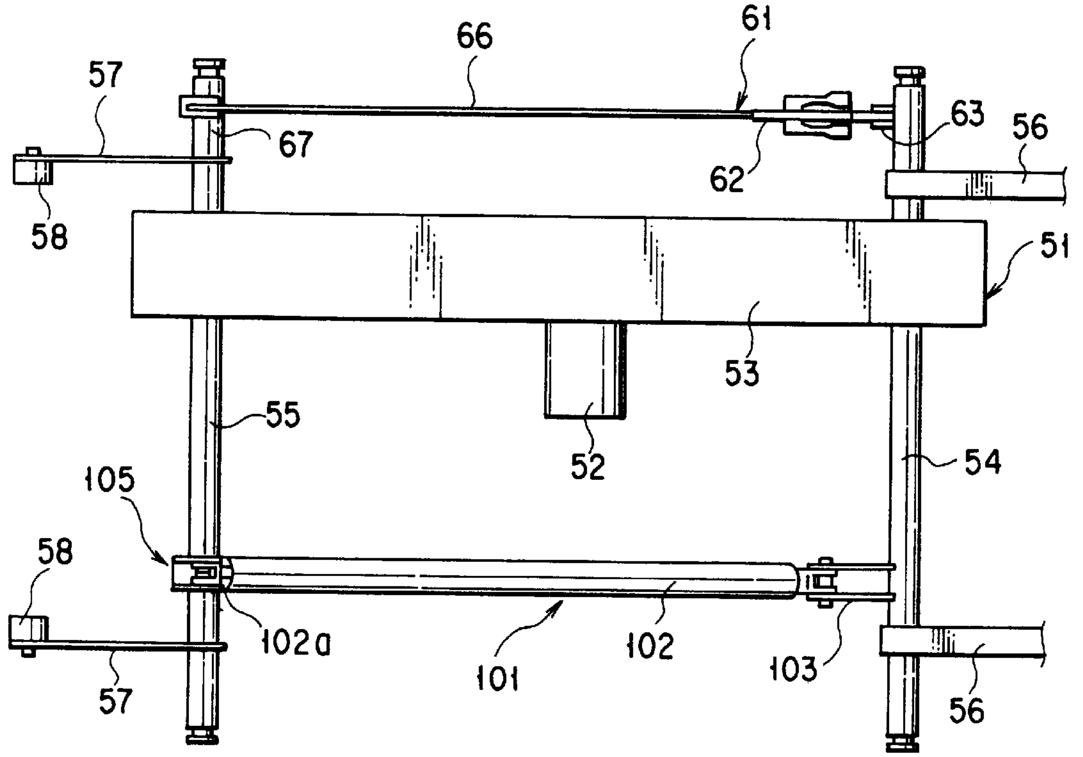
FIG. 11B is a plan view of the back raising drive mechanism.
Figure 12A:
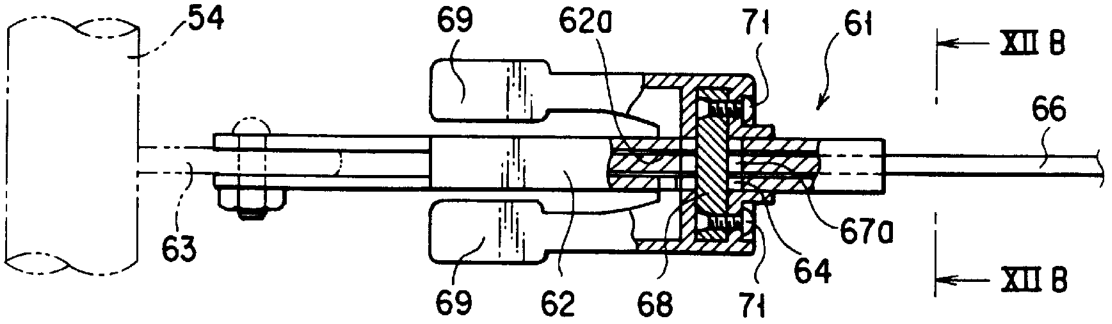
FIG. 12A is a partial cross sectional plan view of a power transmission mechanism.
Figure 12B:
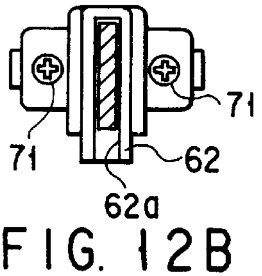
FIG. 12B is a cross sectional view taken along line XIIB—XIIB shown in FIG. 12A.
Figure 12C:
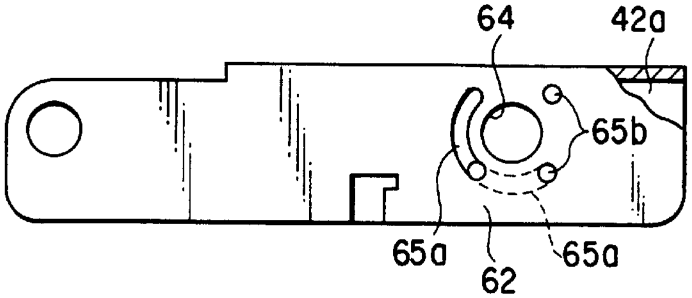
FIG. 12C is a front view of a first link of the power transmission mechanism.
Figure 13:
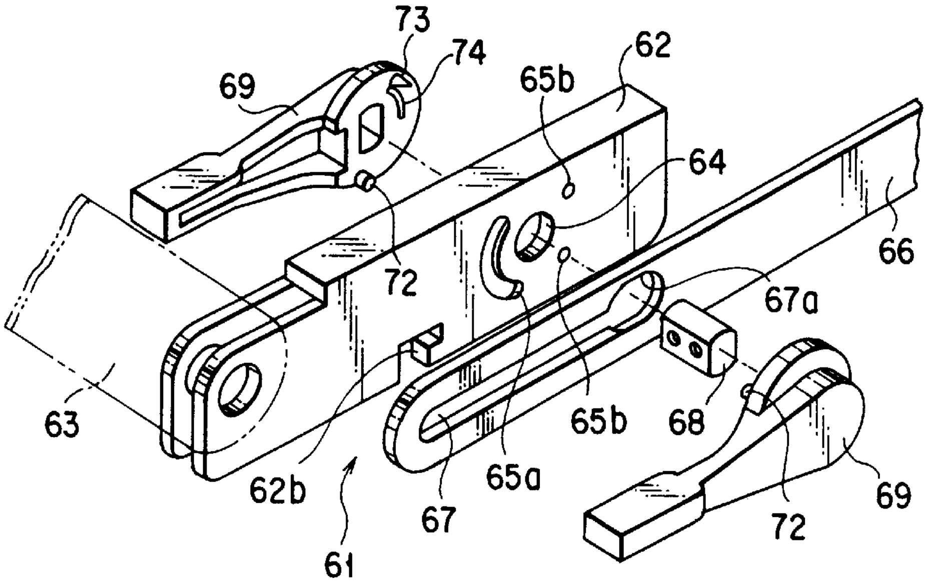
FIG. 13 is an exploded perspective view showing the power transmission mechanism.

Rotations of the first rotational shaft 54 can selectively be transmitted to the second rotational shaft 55 by a power switch mechanism 61. The power switch mechanism 61 is, as shown in FIGS. 11 to 13, formed into a U-shape facing side and comprising a first link 62 having an inside portion formed into an insertion portion 62*a*. Another end of the first link 62 is rotatively supported by a bracket 63 disposed at another end of the first rotational shaft 54.

A through hole 64 penetrating the two side walls of the first link 62 is formed at another end of the first link 62. A pair of engaging holes 65*b* are, apart from an elongated groove 65*a* by an angle of 90 degrees in the circumferential direction, formed around the through hole 64. The elongated grooves 65*a* in the two side walls of the first link 62 are shifted from each other by an angle of 90 degrees in the circumferential direction of the through hole 64, while the two engaging holes 65*b* are formed at the same position.

Another end of a second link 66 attached to an end of the second rotational shaft 55 through a bracket 63 is inserted into an insertion portion 62*a* of the first link 62. A slide hole 67 is, as shown in FIG. 13, formed in another end portion of the second link 66 in the lengthwise direction. A large-diameter portion 67*a* is formed at another end of the slide hole 67.

A bent member 62*b* for inhibiting downward separation of another end of the second link 66 inserted into the insertion portion 62*a* is disposed on one side wall of the first link 62.

The first link 62 and the second link 66 are connected to each other by a block 68 having a flat cross sectional shape. That is, the block 68 is inserted into both of the through hole 64 of the first link 62 and a slide hole 67 of the second link 66. A smaller diameter of the block 68 is made to be substantially the same as the width of the large-diameter portion 67*a*. Therefore, the block 68 can be rotated in the large-diameter portion 67*a*.

The two ends of the block 68 project over the outer surfaces of the two side walls of the first link 62. A lever 69 made of synthetic resin is, as shown in FIG. 12A and by a screw 71, secured to the end portion of the projecting block 68. The inner surface of each lever 69 has a first projection 72 slidably engaged into the elongated groove 65*a* and a conical second projection 73 arranged to be selectively engaged to a pair of engaging holes 65*b* in accordance with the rotational angle of the lever 69. The second projection 73 is able to elastically engage or removed to and from the engaging hole 65*b* because a cut portion 74 is formed in the lever 69.

When the block 68 is positioned in the large-diameter portion 67*a* of the slide hole 67, the lever 69 is able to rotate in an angular range of 90 degrees in such a manner that the first projection 72 is moved along the elongated groove 65*a*. When the lever 69 is in a substantially horizontal state, the block 68 cannot be slid into the slide hole 67. Therefore, the second link 66 cannot slide with respect to the first link 62 attributable to the block 68. The foregoing state is called a “lock state of the power switch mechanism 61”.

When the lever 69 is rotated from the horizontal state to a substantially perpendicular state by an angle of 90 degrees, sliding of the block 68 into the slide hole 67 is permitted. Therefore, sliding of the second link 66 together with the block 68 with respect to the first link 62 is permitted. The foregoing state is called a “suspension state of the power switch mechanism 61”. In the lock state and suspension state, the second projection 73 is elastically engaged to one of the pair of the engaging holes 65*b* so that the lever 69 is held in such a manner that the rotation of the lever 69 is inhibited.

When the back elevating mechanism 51 has been operated in the lock state and its first rotational shaft 54 has been rotated, the rotation is transmitted to the second rotational shaft 55 through the first link 62 and second link 66 of the power switch mechanism 61. Therefore, the second rotational shaft 55 is synchronously rotated.

When the first rotational shaft 54 has been rotated and the first link 62 has been slid in the suspension state, the sliding operation enables the block 68 to be slid with respect to the slide hole 67. As a result, the movement of the first link 62 is not transmitted to the second link 66. Therefore, the second rotational shaft 55 is not rotated. That is, the power switch mechanism 61 is capable of transmitting the rotation of the first rotational shaft 54 to the second rotational shaft 55 and interrupting the transmission.

Figure 10A:
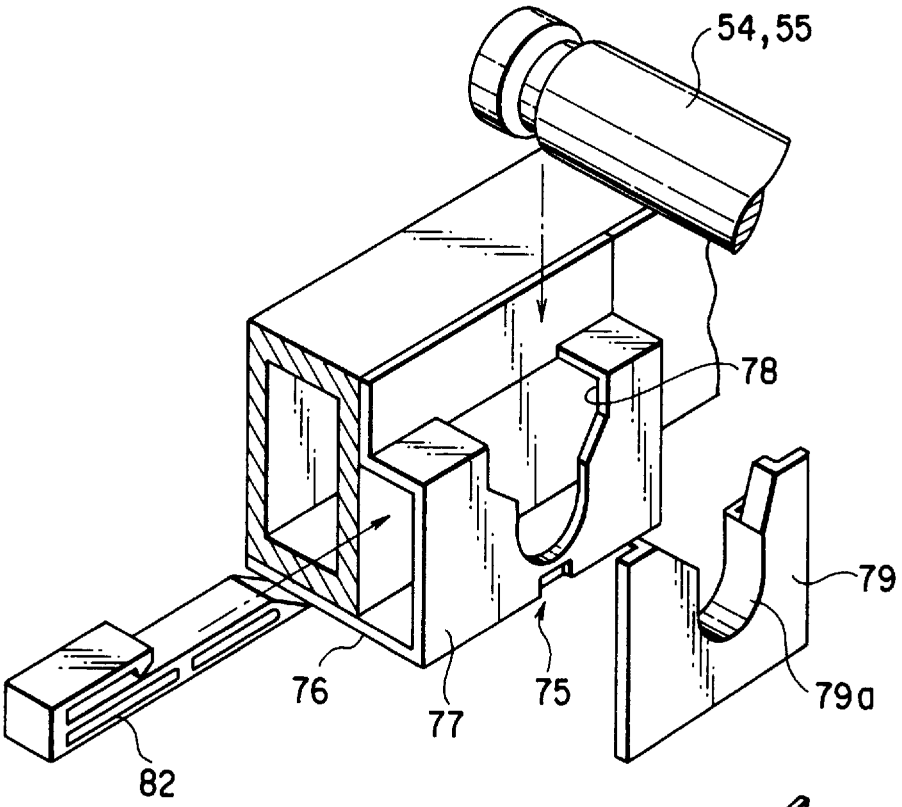
FIG. 10A is a perspective view showing a receiving portion for attaching a rotational shaft of the back raising mechanism to the vertical frame.

The two ends of the first rotational shaft 54 and those of the second rotational shaft 55 are rotatively supported by two receiving portions 75 respectively formed at intermediate portions of the long rod 32 of the elevating frame 31. The receiving portion 75 has a side bracket 76 in the form as shown in FIG. 10A. The side bracket 76 has an expanded portion 77 formed by bending a plate to have a cross sectional shape formed into a substantially U-shape facing side, the expanded portion 77 expanding to the inside portions of the elevating frame 31. The expanded portion 77 has an engaging portion 78 having top and side openings.

Figure 10B:
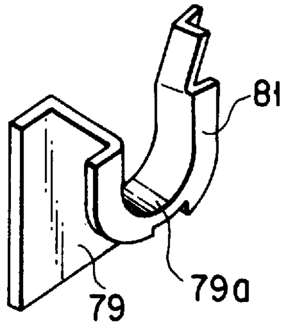
FIG. 10B is a rear view of a bush for rotatively supporting the rotational shaft.

A bush member 79 having U-shape bearing portion 79*a* is attached to the engaging portion 78. That is, a flange 81 is formed along a bearing portion 79*a* on the reverse side of the bush member 79, as shown in FIG. 10B. By engaging the flange 81 to the side surface of the engaging portion 78, the bush member 79 is attached to the expanded portion 77. Moreover, end portions of the first and second rotational shafts 54 are rotatively received by the bearing portion 79*a* of the bush member 79.

The end of each of the rotational shafts 54 and 55 received by the bearing portion 79*a* is prevented from being separated from the bearing portion 79*a* by a clip 82 elastically mounted to the top surface of the expanded portion 77. As a result, the back elevating mechanism 51 is attached to the elevating frame 31.

Figure 4:
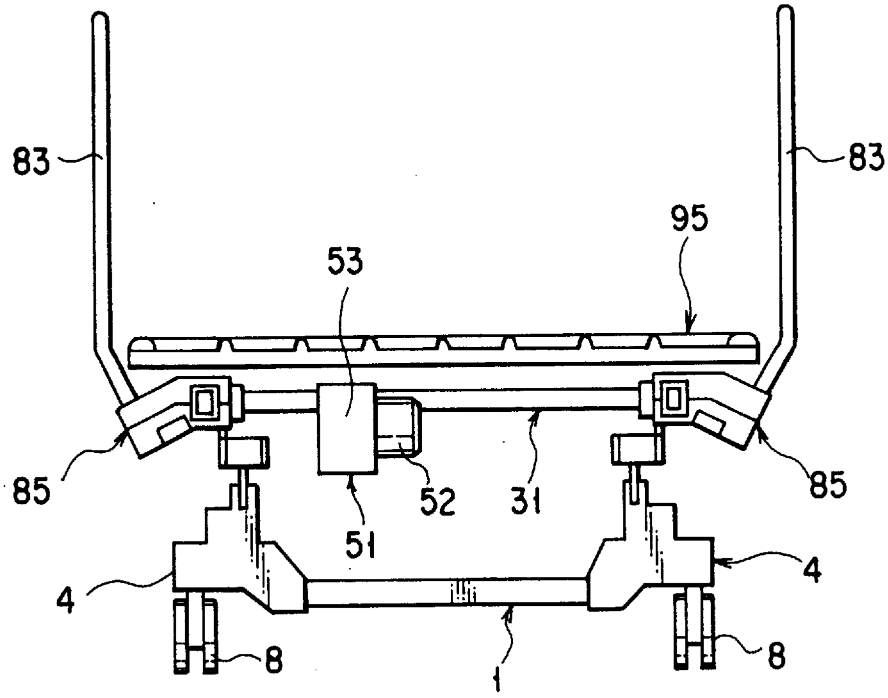
FIG. 4 is a side view of the bed apparatus.
Figure 9:
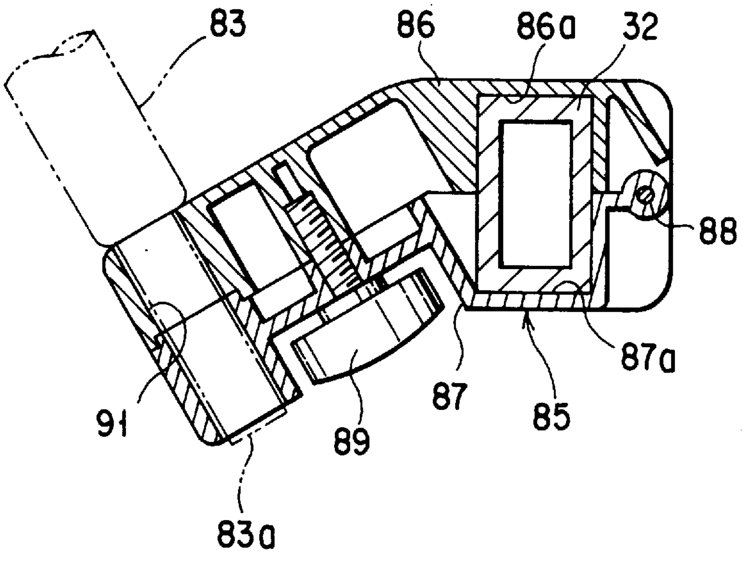
FIG. 9 is a cross sectional view of a holding member for holding a side plate onto the vertical frame.

A pair of holding members 85 for holding side frames 83 formed as shown in FIG. 4 are formed at intermediate portions of the pair of the long rods 32 of the elevating frame 31. The holding member 85, as shown in FIG. 9, has an upper member 86 bent into a substantially wedge shape, a lower member 87 having an end rotatively connected to the upper member 86 by a pin 88 and formed into a wedge shape, and a screw 89 for connecting and securing the foregoing members.

Holding portions 86*a* and 87*a* in the recess shape for holding the long rod 32 are formed in the surface of joining between the upper member 86 and the lower member 87. That is, the holding members 85 hold the long rod 32 when the holding members 85 is attached.

A holding hole 91 through which the upper member 86 and the lower member 87 are allowed to pass is formed in the other end of the holding members 85 bent downwards. When a rod 83*a* attached to the lower end of the side frame 83 is inserted into the holding hole 91, the side frame 83 can be detachably attached to the side portion of the elevating frame 31.

The side frame 83 has a lower portion formed into a dog legged shape, as shown in FIG. 4. Thus, the upper portion of the side frame 83 higher than the bent portion of the same is made to be placed vertically.

Moreover, the holding members 85 is bent into a wedge shape and the lower portion of the side frame 83 is bent into the dog legged shape facing side so that the side frame 83 is held in such a manner that considerable outward projection of the holding members 85 over the widthwise end of a base plate 95 is inhibited. Therefore, when the side plate 83 is provided for the side portion of the elevating frame 31, the enlargement of the size of the bed apparatus can be prevented due to the holding members 85.

Figure 2:
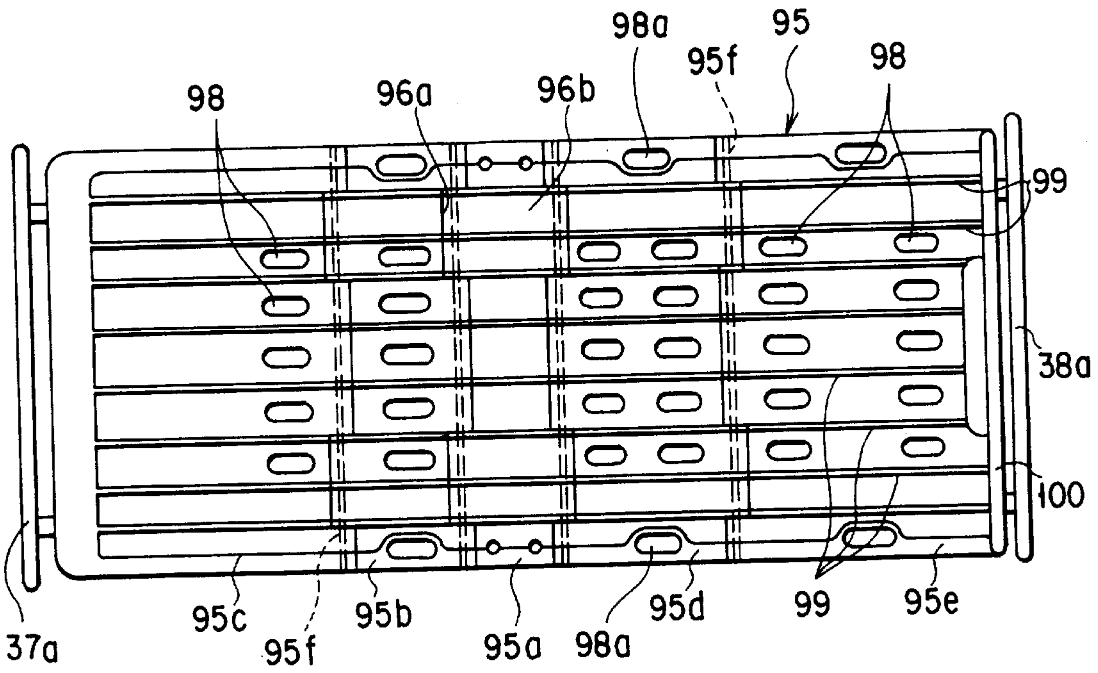
FIG. 2 is a plan view of the bed apparatus.

The base plate 95 is provided on the elevating frame 31. The base plate 95 is, as shown in FIGS. 1 and 2, divided into five base plate portions along the lengthwise direction of the elevating frame 31. That is, the central portion in the lengthwise direction of the base plate 95 is formed into a fixed base plate portion 95*a* secured to the elevating frame 31. A hip plate portion 95*b* and a back plate portion 95*c* are sequentially and rotatively connected to an end portion of the fixed base plate portion 95*a*.

Figure 16A:
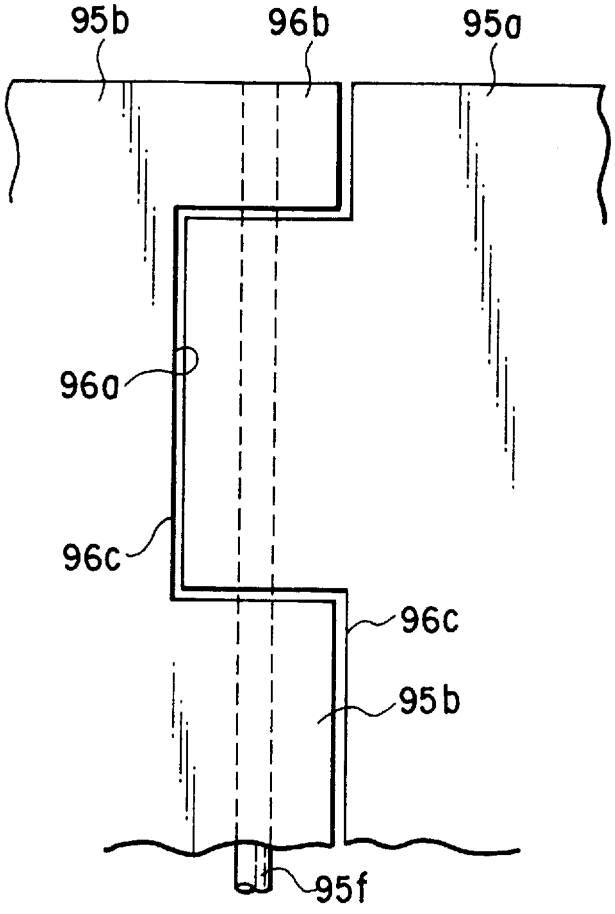
FIG. 16A is a partially enlarged plan view showing a pair of connection portions of a base plate portion.

A first leg plate portion 95*d* and a second leg plate portion 95*e* are sequentially and rotatively connected to another end of the fixed base plate portion 95*a*. End portions of the base plate portions connected rotatively are, as shown in FIGS. 2 and 16A, formed into recesses 96*a* and projections 96*b* so as to be engaged to each other. The engaged portions are rotatively connected to each other by a connection shaft 95*f*.

As a result, when each base plate portion has been raised by the back elevating mechanism 51, a mattress M is moderately bent.

Figure 16B:
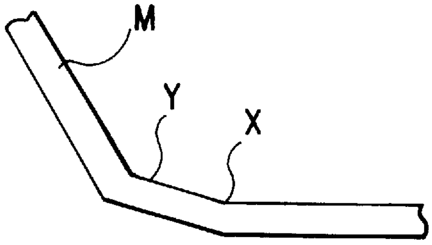
FIG. 16B is a view of explanatory showing a state where a mattress is warped in a case where the pair of the connection portions of the base plate portion are formed into projections and pits.

That is, the end portions of each of the connected base plate portions are formed into projections and pits so that the mattress M is, at the connected portions, bent at two portions X and Y which are an internal edge portion 96*c* of a recess 96*a* of the fixed base plate portion 95*a* and an internal edge portion 96*c* of the recess 96*a* of the hip plate portion 95*b* shown in FIG. 16A. The state where the mattress M is bent at this time is shown in FIG. 16B.

Figure 16C:
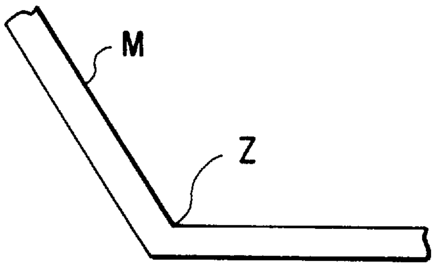
FIG. 16C is a view of explanatory showing a state where the mattress is warped in a case where the pair of the connection portions are not formed into the projections and pits.

If the projections and pits are not provided for the fixed base plate portion 95*a* and the hip plate portion 95*b* and if they are rotatively connected to each other by, for example, hinges, the mattress M is, at the connection portion, bent in only portion Z as shown in FIG. 16C so as to be bent to make a predetermined angle.

Therefore, when the mattress M is bent to make a predetermined angle, the recess 96*a* and the projection 96*b* formed at the ends of the fixed base plate portion 95*a* and the hip plate portion 95*b* connected rotatively enable the mattress M to be bent at a gentle angle in the connection portion. Thus, the hip portion of the user is not pressed excessively.

Although this embodiment has the structure such that the end portions for connecting the base plate portions 95*a* to 95*e* are formed into projection and pits, only the connection portions of the fixed base plate portion 95*a*, the hip plate portion 95*b* and the back plate portion 95*c* may be formed into projections and pits.

Each of the base plate portions 95*a* to 95*e* of the base plate 95 has a ventilation hole 98. Moreover, projection lines 99 are, in the widthwise direction, formed on the top surface of each of the base plate portions 95*a* to 95*e* at predetermined intervals. In addition, attaching holes 98*a* for fixing a restraint belt (not shown) for restraining movement of a user on the base plate 95 are formed at two widthwise ends of the hip plate portion 95*b* and the first and second leg plate portions 95*d* and 95*e*.

Since the mattress M is made to easily be slid in the lengthwise direction of the base plate 95 and not to easily be slid in the widthwise direction of the same attributable to the contact with the projection lines 99, raising of the base plate portions 95*b* to 95*e* causes the mattress M to smoothly be slid along the projection lines 99. Therefore, also raising of the base plate portions 95*b* to 95*e* can smoothly be performed. The projection lines 99 inhibit slippage of the mattress M in the widthwise direction of the base plate 95.

A plate-like stopper 100 in contact with an end of the mattress M is provided at the end of the second leg plate portion 95*e*. The stopper 100 is arranged to inhibit sliding of the mattress M in the direction toward the second leg plate portion 95*e* when the mattress M has been bent attributable to the rotation of the back plate portion 95*c* in the raising direction. That is, the mattress M is arranged to be slid in a direction toward the back plate portion 95*c*.

Figure 3:
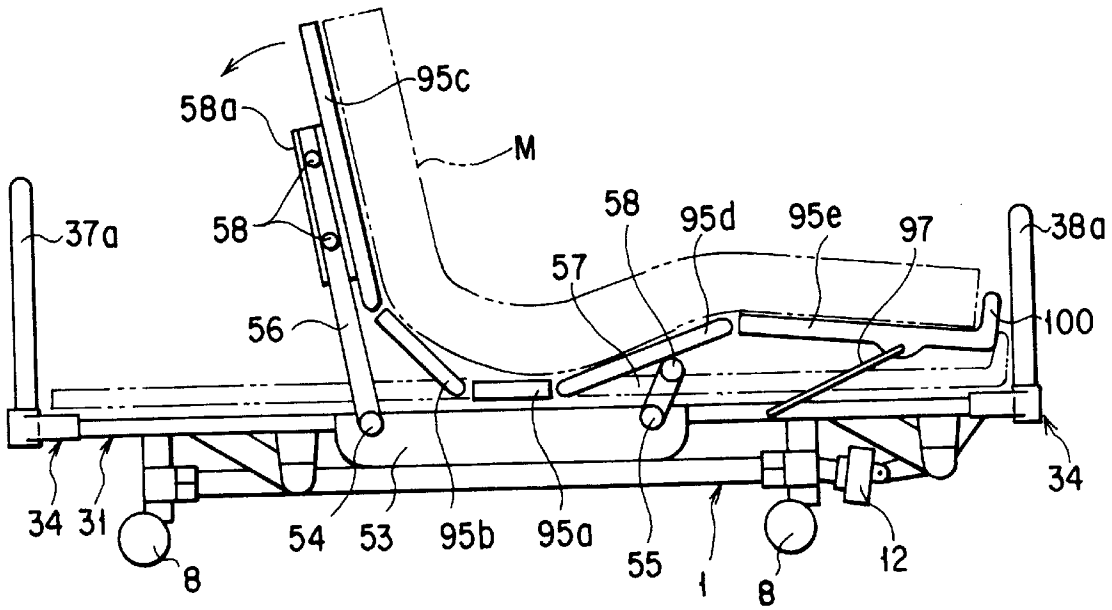
FIG. 3 is a front view of the bed apparatus.

A pair of rollers 58 provided for the first raising arm 56 of the back elevating mechanism 51 are engaged to rails 58*a* formed on the lower surface of the back plate portion 95*c* of the base plate 95, as shown in FIG. 3. A roller 58 provided for the first raising arm 56 is in contact with the lower surface of the first leg plate portion 95*d*.

When the first rotational shaft 54 of the back elevating mechanism 51 have been rotated and thus the first raising arm 56 has been moved upwards, the back plate portion 95*c* is pressed by the roller 58 and therefore rotated and moved upwards. The hip plate portion 95*b* synchronizes with the rotation of the back plate portion 95*c*. As a result, the upper half of the body of the user on the mattress M is raised.

The back plate portion 95*c* raised by the first raising arm 56 is supported by the pair of the rollers 58. Therefore, even if the user leans against the raised back plate portion 95*c* and moment in a direction indicated by an arrow shown in FIG. 3 acts, the back plate portion 95*c* does not rotate in the direction indicated by the arrow together with the hip plate portion 95*b* because the back plate portion 95*c* is supported by the pair of the rollers 58. That is, the state where the back plate portion 95*c* is raised can reliably be maintained.

When the second rotational shaft 55 is synchronized with the rotation of the first rotational shaft 54 by the power switch mechanism 61, the second raising arm 57 is moved upwards so that the first leg plate portion 95*d* is rotated upwards. The second leg plate portion 95*e* synchronizes with the foregoing rotation.

An intermediate portion of a holding member 97 formed by bending a wire into a U-shape facing side is rotatively connected to the lower surface of the second leg plate portion 95*e*. The two ends of the holding member 97 are rotatively connected to the long rod 32 of the elevating frame 31. Therefore, the second leg plate portion 95*e* arranged to be moved in synchronization with the rotation of the first leg plate portion 95*d* is held by the holding member 97 in such a manner that a substantially wedge shape is formed together with the first leg plate portion 95*d*.

Figure 17:
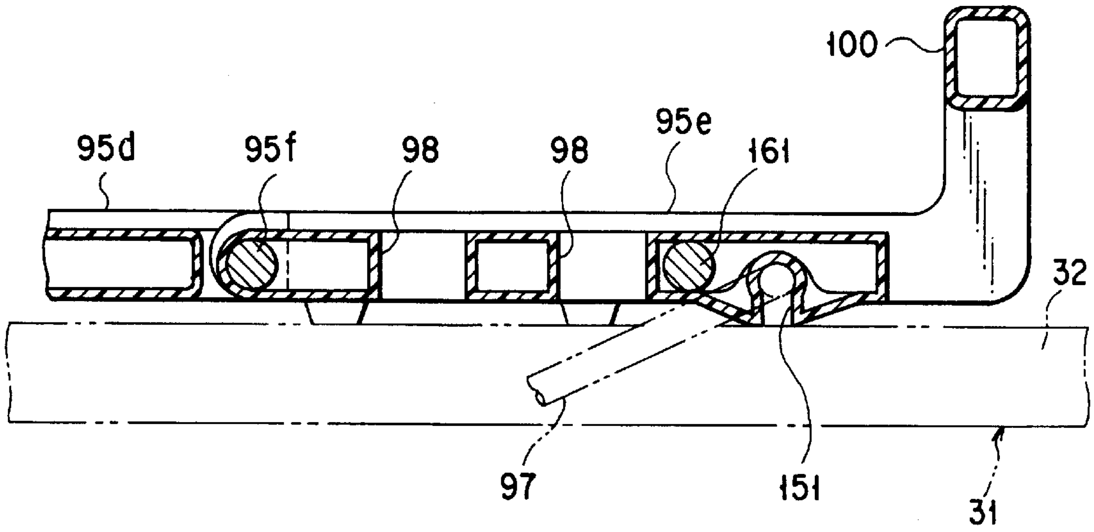
FIG. 17 is a cross sectional view showing a leg plate portion formed in the lengthwise direction of the base plate portion.
Figure 18:
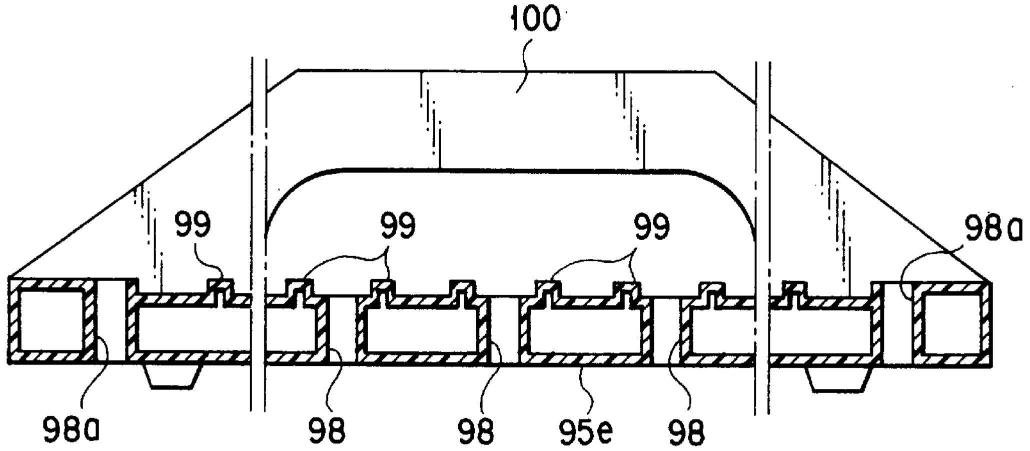
FIG. 18 is a cross sectional view showing the leg plate portion formed in the widthwise direction of the base plate portion.

An intermediate portion of the holding member 97 is elastically and rotatively inserted into two attaching portions 151 (only one attaching portion 151 is illustrated) disposed on the lower surface of the second leg plate portion 95*e*, as shown in FIG. 17. That is, each of the base plate portions 95*a* to 95*e* of the base plate 95 is formed into a hollow shape by blow-molding synthetic resin, as shown in FIGS. 17 and 18. When the molding operation is performed, the attaching portions 151 are simultaneously formed.

Figure 19A:
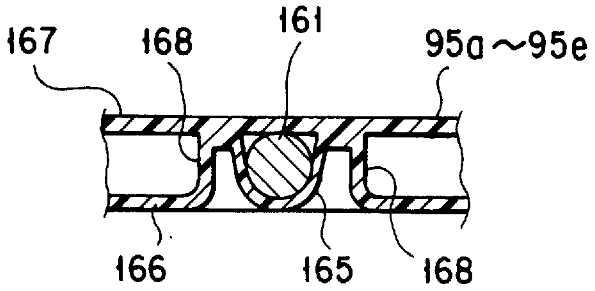
FIG. 19A is a cross sectional view of a portion in which a reinforcing member for each base plate portion is provided.
Figure 19B:
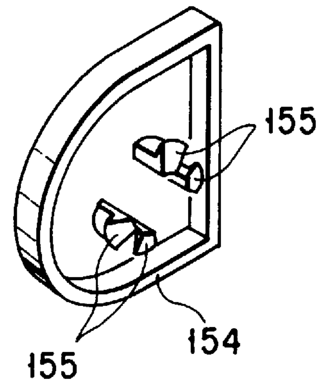
FIG. 19B is a perspective view of a first cap which is attached to the side surface of the base plate portion.
Figure 19C:
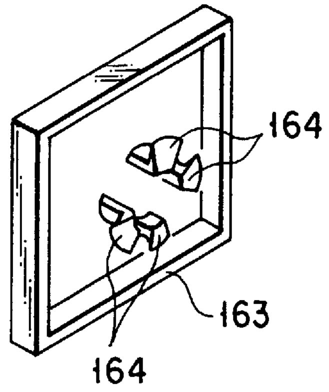
FIG. 19C is a perspective view of a first cap which is attached to the side surface of the base plate portion.
Figure 19D:
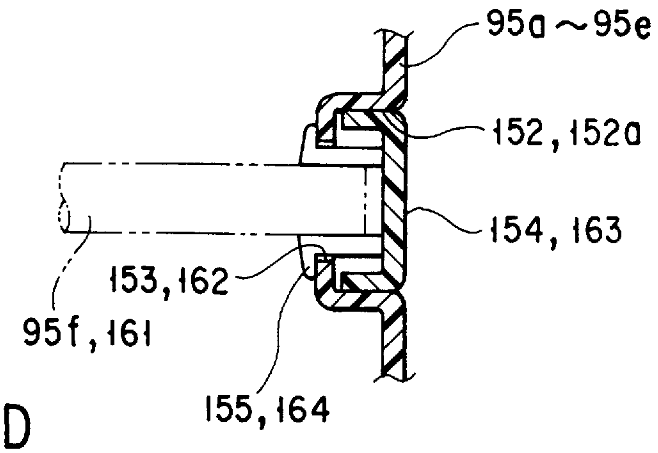
FIG. 19D is a cross sectional view showing a state where each cap is attached.

The connection shaft 95*f* for connecting the adjacent base plate portions is, as shown in FIG. 19D, inserted through a first insertion hole 153 formed at a widthwise end of each base plate portion. The first insertion hole 153 is opened in a recess 152 formed in a widthwise end surface of the base plate portion.

A first cap 154 in the form of a semicircle as shown in FIG. 19B is attached to the recess 152. A plurality of claws 155 are formed to project over the inner surface of the first cap 154. The leading end of the claws 155 penetrates the first insertion hole 153 to be engaged to the inner surface of the recess 152. As a result, separation of the connection shaft 95*f* inserted into the base plate portion through the first insertion hole 153 can be prevented by the first cap 154.

A reinforcing member 161 is inserted into each of the base plate portions formed into a hollow shape by blow molding. Similarly to the connection shaft 95*f*, the reinforcing member 161 is inserted through a second insertion hole 162 formed at a widthwise end of the base plate portion (see FIG. 19D). The second insertion hole 162 is formed in a recess 152*a*. A second cap 163 in a rectangular shape as shown in FIG. 19C is attached to the recess 152*a*. A claw 164 is formed to project over the second cap 163. The leading end of the claw 164 is engaged to the inner surface of the recess 152.

The reinforcing member 161 is integrally formed with each of the base plate portion by a pair of support portions 165 (only one of the support portions 165 is illustrated) formed integrally with the two widthwise end of each base plate portion, as shown in FIG. 19A. The support portion 165 is formed to have a cross sectional shape capable of holding the reinforcing member 161 by integrally forming a lower wall 166 of the hollow base plate portion with the inner surface of an upper wall 167 to form a pair of ribs 168.

Therefore, although each base plate portion is a hollow shape, the reinforcing member 161 inserted and held by the support portions 165 is integrally provided with the base plate portion. Therefore, the base plate portion can reliably be reinforced. Since the top surface of each of the hollow base plate portion is as well as reinforced by the projection lines 99 formed on each of the top surfaces of the base plate portions, deflection cannot easily be generated even a load is applied.

Figure 14:
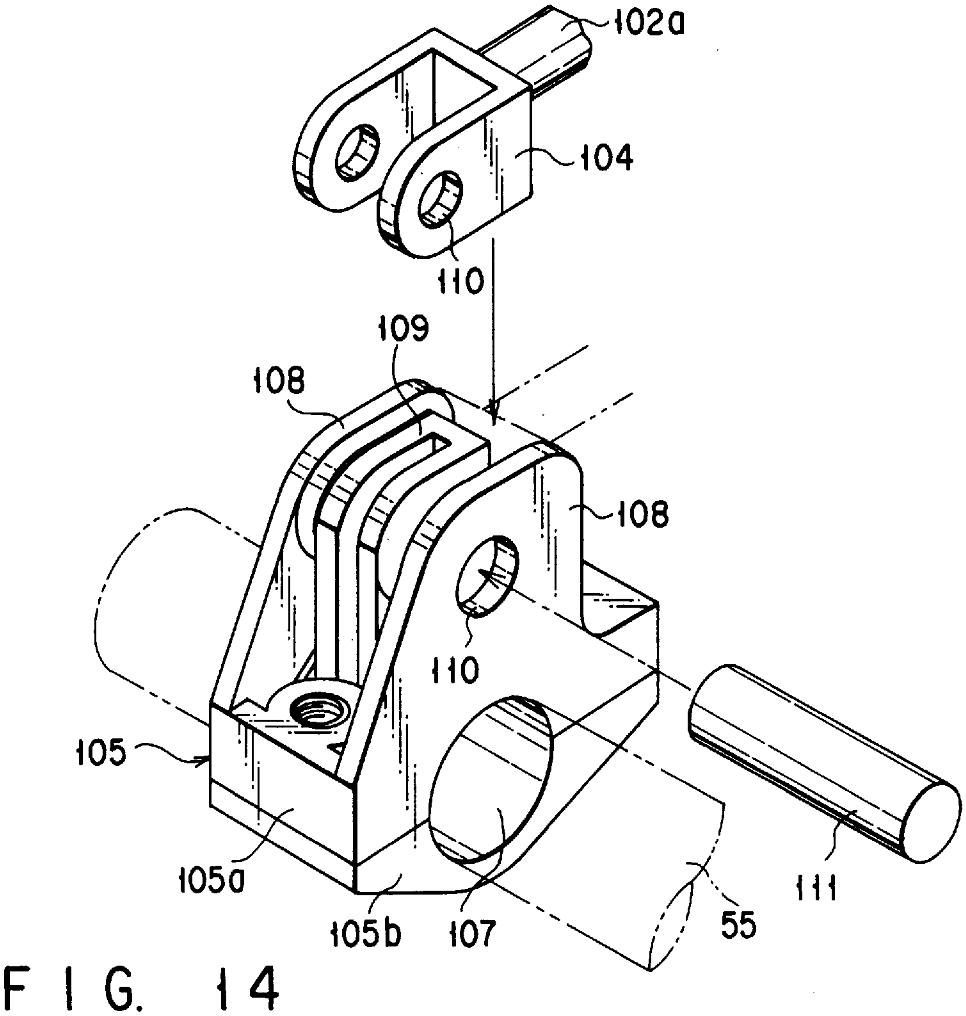
FIG. 14 is a perspective view showing a connector of a damper mechanism.
Figure 15:
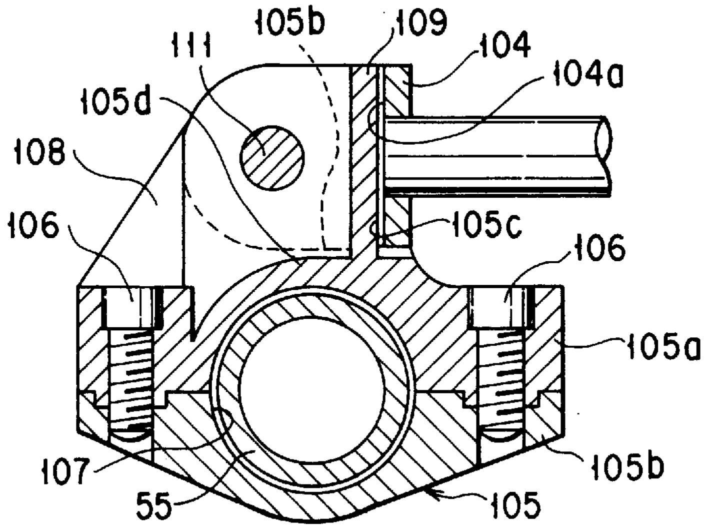
FIG. 15 is a cross sectional view showing the connector of the damper mechanism.

The back elevating mechanism 51 is provided with a damper mechanism 101 for preventing rapid inclination of the back plate portion 95*c* which has been rotated upwards by the first raising arm 56. The damper mechanism 101 has a gas spring 102. An end of the gas spring 102 is, as shown in FIGS. 11A, 14 and 15, attached to a bracket 103 secured to the first rotational shaft 54. A block 104 in a U-shape facing side provided at the leading end of a rod 102*a* of the gas spring 102 is rotatively connected to a connector 105 rotatively attached to the second rotational shaft 55. The rod 102*a* has substantially no resistance when it slides in the projecting direction and resistance when it slides in the introduction direction.

That is, the connector 105 is composed of an upper member 105*a* and a lower member 105*b* connected to each other by a screw 106 in such a manner that they can be decomposed. An attaching hole 107, through which the second rotational shaft 55 is rotatively inserted, is formed in the connection surface.

A pair of attaching members 108 running parallel to each other are stood erect on the upper member 105*a*. An attaching member 109 having a cross sectional shape formed into a U-shape facing side and arranged to be inserted into the block 104 is formed between the attaching members 108.

A through hole 110 is formed in each of the attaching members 108, the attaching member 109 and the block 104. The block 104 is connected to the connector 105 by a support shaft 111 inserted into the through hole 110.

The block 104 connected to the connector 105 is slightly rotated so that an inner surface 104*a* in the intermediate portion of the block 104 is attached to an outer surface 105*c* in the intermediate portion of an attaching member 109. A lower end surface 104*b* is attached to an upper surface 105*d* of the upper member 105*a*. As a result of the attachment above, sliding of the connector 105 in the axial direction of the second rotational shaft 55 is inhibited. Moreover, rotation of the connector 105 around the axis is inhibited when the rod 102*a* is moved forwards/rearwards.

Therefore, when the power switch mechanism 61 has been suspended to operate the back elevating mechanism 51 and rotate only the first rotational shaft 54, the first raising arm 56 is upwards rotated so that the back plate portion 95*c* is raised. At this time, the rod 102*a* of the gas spring 102 of the damper mechanism 101 is slid in the projecting direction without remarkable resistance.

If the first rotational shaft 54 is brought to a state where it can be freely rotated for some reason in a state where the back plate portion 95*c* is stood erect, the back plate portion 95*c* sometimes tends to be rapidly rotated in the inclining direction attributable to the load of the user. However, since the rod 102*a* of the gas spring 102 has resistance against sliding in the introducing direction, rapid inclination of the back plate portion 95*c* can be prevented.

When the back elevating mechanism 51 is operated after the power switch mechanism 61 has been locked, the gas spring 102 is synchronously operated with the rotation of the first rotational shaft 54. Since the connector 105 to which the rod 102*a* of the gas spring 102 is attached is not rotated with respect to the second rotational shaft 55, rotation of the first rotational shaft 54 is not transmitted to the second rotational shaft 55 through the gas spring 102. That is, even if the damper mechanism 101 is provided for preventing rapid inclination of the back plate portion 95*c*, the damper mechanism 101 does not transmit the rotation of the first rotational shaft 54 to the second rotational shaft 55 when the power switch mechanism 61 is in a suspended state.

The bed apparatus having the foregoing structure such that the base frame 1 is formed into the rectangular shape by connecting the ends of the long frames 2 and those of the short frames 3 by the first connection members 4. That is, the first insertion portion 5 and the second insertion portion 6 are integrally formed with the first connection member 4. Moreover, the ends of the long frame 2 and the short frame 3 respectively are inserted into each of the insertion portions 5 and 6. Thus, the rectangular base frame 1 is formed.

Therefore, the base frame 1 can be assembled by simply inserting and securing the rods 2 and 3 into the insertion portions 5 and 6. Since no welding operation is required as has been performed with the conventional structure, the base frame 1 can easily be assembled without skill. Since the assembling operation can easily be completed, the bed apparatus in a disassembled state can be delivered from a manufacturing plant and a purchaser is able to assemble the base frame 1 at a place, for example, the home of the purchaser, at which the bed apparatus is placed. Therefore, the size of the package of the apparatus when transported can be reduced so that handling, including transportation and horizontal carry, is made easier.

The first connection member 4 of the base frame 1 has the attaching portion 7 for attaching the second arms 19*a*, 19*b* of the elevation mechanism 11 and the attaching hole 9 for attaching the caster 8 which are integrally formed together with the first and second insertion portions 5 and 6. Therefore, elements only for attaching the second arms 19*a*, 19*b* and the caster 8 are not required so that the number of elements is reduced and thus the cost is reduced. Moreover, the assembling operation can be facilitated.

Also the elevating frame 31 is, similar to the base frame 1, assembled into a rectangular shape by inserting and securing the ends of the long rod 32 and the short rod 33 to the first and second insertion portions 36 and 37 provided for the second connection member 34.

Therefore, also the elevating frame 31 can easily be assembled without a welding operation. Thus, the assembling operation can be performed without skill. Therefore, the bed apparatus in a disassembled state can be delivered from a manufacturing plant and a purchaser is able to assemble the base frame 1 at a place at which the bed apparatus is placed. As a result, the size of the package of the apparatus when transported can be reduced so that handing, including transportation and horizontal carry, is made easier.

The second connection member 34 has the holding hole 39 formed integrally in order to attach the head board 37*a* and the foot board 38*a*. Therefore, elements for only attaching the boards 37*a* and 38*a* are not required. As a result, the number of elements can be decreased so that structure is simplified and the cost is reduced.

The elevating frame 31 is provided with the back elevating mechanism 51 which moves the first raising arm 56 and the second raising arm 57 in the raising direction. Thus, the back plate portion 95*c*, hip plate portion 95*b* and first and second leg plate portions 95*d* and 95*e* of the base plate 95 can be moved upwards.

By operating the lever 69 of the power switch mechanism 61 of the back elevating mechanism 51, the rotation of the drive motor 52 can be transmitted to the second raising arm 57 or the transmission can be interrupted.

As a result, in a case where a user on the mattress M is intended to raise the upper half of the body and not to bend the legs, the lever 69 of the power switch mechanism 61 is operated to realize a state where the block 68 is able to slide with respect to the slide hole 67 so that transmission of the rotations of the drive motor 52 to the second raising arm 57 is interrupted. Thus, only the first raising arm 56 is operated while inhibiting the operation of the second raising arm 57 so that the back plate portion 95*c* and the hip plate portion 95*b* arranged to be operated in synchronization with the back plate portion 95*c* are raised by the first raising arm 56 to raise the upper half of the body of the user.

In a case where the user intends to raise the upper half of the body and bend the leg, the lever 69 of the power switch mechanism 61 is rotated by 90 degrees to inhibit sliding of the block 68 with respect to the slide hole 67. Thus, the second link 66 can be synchronized with the operation of the first link 62 so that the rotations of the drive motor 52 are transmitted to the second raising arm 57 as well as to the first raising arm 56.

When the second raising arm 57 has been operated, the first leg plate portion 95*d* is raised. The second leg plate portion 95*e* is synchronously operated so that the foregoing base plate portion is bent into a substantially wedge shape. Thus, also the leg portion of the user is bent into a substantially wedge shape so that slippage of the body of the user attributable to the bent leg portion is inhibited when the upper half of the body of the user has been raised.

When the hip plate portion 95*b* is raised with respect to the fixed base plate portion 95*a* in the case where the upper half of the body of the user is raised, raising of the hip plate portion 95*b* with respect to the fixed base plate portion 95*a* causes the mattress M to be bent. The connected ends of the fixed base plate portion 95*a* and the hip plate portion 95*b* are formed into projections and pits such that the recess 96*a* and the projection 96*b* are engaged to each other. Moreover, the projection portions and the pit portions are rotatively connected by the connection shaft 95*f*.

Therefore, the mattress M is bent at the internal edge portion 96*c* of the recess 96*a* of the fixed base plate portion 95*a* and at the internal edge portion 96*c* of the recess 96*a* of the hip plate portion 95*b*. As a result, the mattress M is warped with a curvature larger than that in a case where the connection portions of the fixed base plate portion 95*a* and hip plate portion 95*b* are not formed into the projections and pits. Thus, the portion of the user from the hip to the back of the user corresponding to the connection portion of the fixed base plate portions 95*a* and 95*b* cannot be pressed considerably.

Moreover, the base plate 95 is divided into five base plate portions, and the back plate portion 95*c* is pushed up by the roller 58 provided for the first raising arm 56 when the base plate portion is raised. Although the hip plate portion 95*b* is provided between the back plate portion 95*c* and the fixed base plate portion 95*a*, the first raising arm 56 pushes up only the internal edge portion 96*c*.

As a result, the back plate portion 95*c* is raised while being bent at the connection portion between the back plate portion 95*c* and the hip plate portion 95*b*. Therefore, an angle of raising of the back plate portion 95*c* is made to be larger than that of the hip plate portion 95*b*. That is, the hip plate portion 95*b* is positioned between the fixed base plate portion 95*a* and the back plate portion 95*c* while making a raising angle to be more gentle than that of the back plate portion 95*c*.

Therefore, the portion of the mattress M placed on the base plate 95 corresponding to the hip of the user cannot easily be bent because the raising angle of the hip plate portion 95*b* is smaller than that of the back plate portion 95*c*.

Thus, the hip of the user on the mattress M cannot be held by the mattress M when the base plate portion is raised so that the hip is not pressed with the compressive force generated in the upper portion of the mattress M.

Each of the base plate portions 95*a* to 95*e* of the base plate 95 has the projection lines 99 formed in the lengthwise direction at predetermined intervals in the widthwise direction so that the slippage of the mattress M placed on the base plate 95 in the lengthwise direction is inhibited. Therefore, when, for example, the back plate portion 95*c* is raised, the mattress M bent attributable to the raising operation is smoothly slid with respect to the base plate 95. As a result, load applied to the back elevating mechanism 51 when the base plate portion is raised cannot be enlarged. Moreover, the mattress M is not bent in such a manner that it separates from the top surface of the base plate 95.

Since widthwise slippage of the mattress M in the widthwise direction of the base plate 95 can be prevented thanks to the projection lines 99, considerable shift of the mattress M in the widthwise direction of the base plate 95 does not take place even if each base plate portion of the base plate 95 is repeatedly raised and inclined.

A second embodiment of the present invention will now be described with reference to FIGS. 20 to 23. Note that the same elements as those according to the first embodiment are given the same reference numerals and the same elements are omitted from description.

The second embodiment is different from the first embodiment in the structure of the back elevating mechanism 51 and that of the hip plate portion 95*b*.

Figures 22A, 22B:
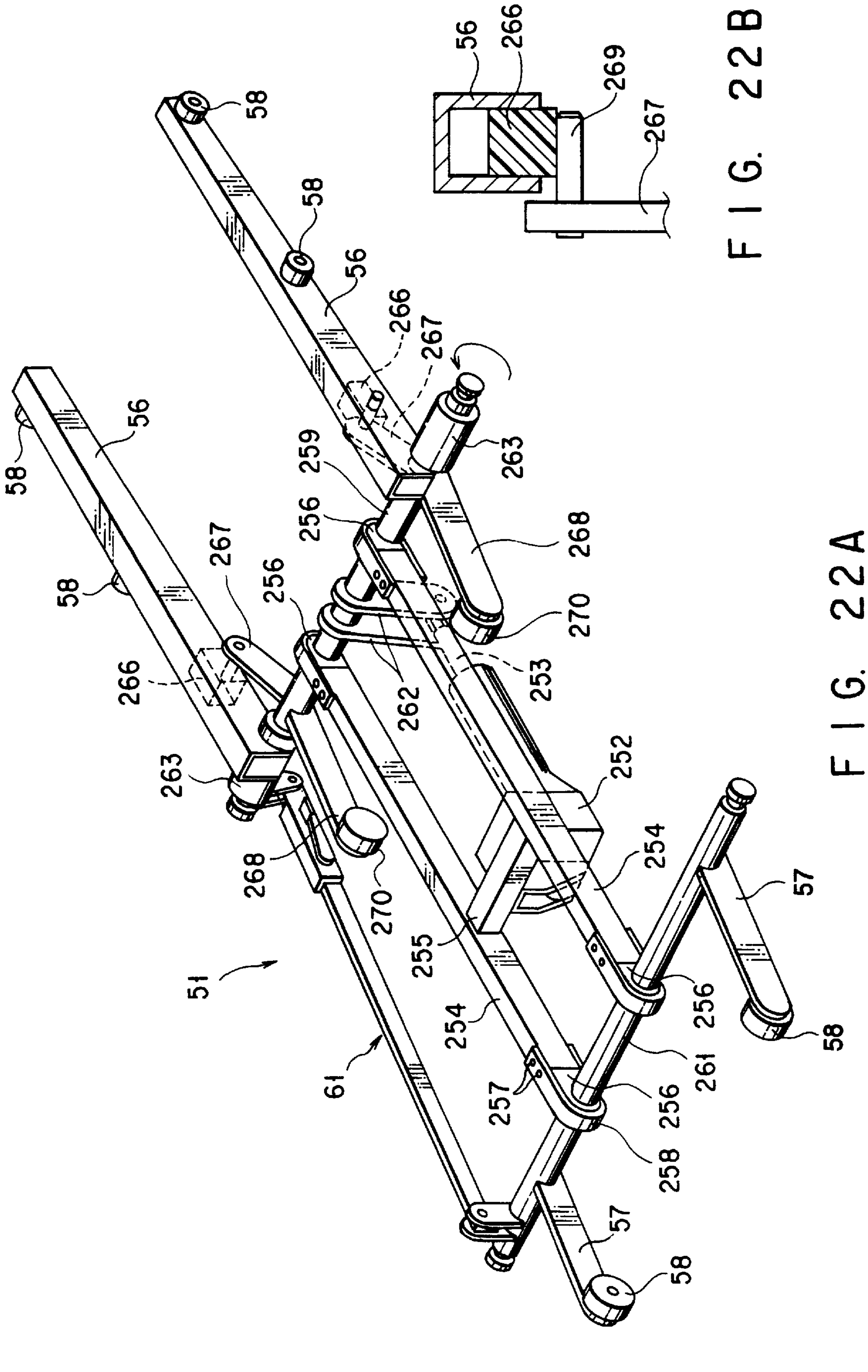
FIG. 22A is a perspective view showing the back raising mechanism.
FIG. 22B is a cross sectional view showing a state of the connection between a synchronous arm and a raising arm.

The back elevating mechanism 51, as shown in FIG. 22A, has a power source 252. A drive shaft 253 is attached to the power source 252, and the drive shaft 253 is arranged to be moved in the axial direction by the power source 252.

The power source 252 is attached to a horizontal rod 255 arranged between a pair of support members 254 running parallel to each other. Each of the first rotational shafts 54 is made of a rectangular pipe member. A portion of a synthetic block 256 is inserted into the two ends of the support members 254. The two ends of the block 256 are held by a U-shape metal band 258 secured to the upper and lower surfaces of the support members 254 with screws 257.

Two intermediate portions of the first rotational shaft 54 are rotatively supported by the pair of the blocks 256 provided on either end of the pair of support members 254, while two intermediate portions of the second rotational shaft 55 are rotatively supported by the pair of the blocks 256 provided for the other end.

An end of an arm 262 is secured to the central portion of the first rotational shaft 54 in the axial direction, while a collar 263 is rotatively mounted on each of the two ends of the first rotational shaft 54. A leading end of the drive shaft 253 of the power source 252 is rotatively connected to another end of the arm 262. A base portion of the first raising arm 56 made of an inverted U-shape member having an opened lower surface is secured to the collar 263. The pair of receiving rollers 58 are rotatively provided for the outer surface of the leading end of the first raising arm 56, while a receiving member 266 is inserted and secured into the base portion of the receiving roller 58 in such a manner that a portion of the receiving member 266 projects over the lower surface of the base portion.

A synchronous arm 267 projecting toward the first raising arm 56 and a hip raising arm 268 projecting toward the support members 254 are provided for the portion of the two ends of the first rotational shaft 54 inner than the first raising arm 56 in such a manner that one end of the arms is secured. A pin 269 arranged to be engaged to the lower surface of the receiving member 266 is provided for the leading end of the synchronous arm 267, as shown in FIG. 22B. A first push-up roller 270 is rotatively provided for the leading end of the hip raising arm 268.

The base portion of the second raising arm 57 is secured to each of the two ends of the second rotational shaft 55. The second push-up roller 58 is rotatively provided for the leading end of the second raising arm 57.

When the drive shaft 253 is rotated in the projecting direction as a result of the operation of the power source 252, the first rotational shaft 54 is rotated counterclockwise through the arm 262 in a direction indicated by an arrow shown in FIG. 22A. When the synchronous arm 267 synchronizes with the rotation of the first rotational shaft 54, the first raising arm 56 is pushed upwards by the pin 269 provided for the synchronous arm 267 through the receiving member 266.

The rotation of the first rotational shaft 54 can selectively be transmitted to the second rotational shaft 55 by a power switch mechanism 61 having the same structure as that according to the first embodiment.

Figure 20:
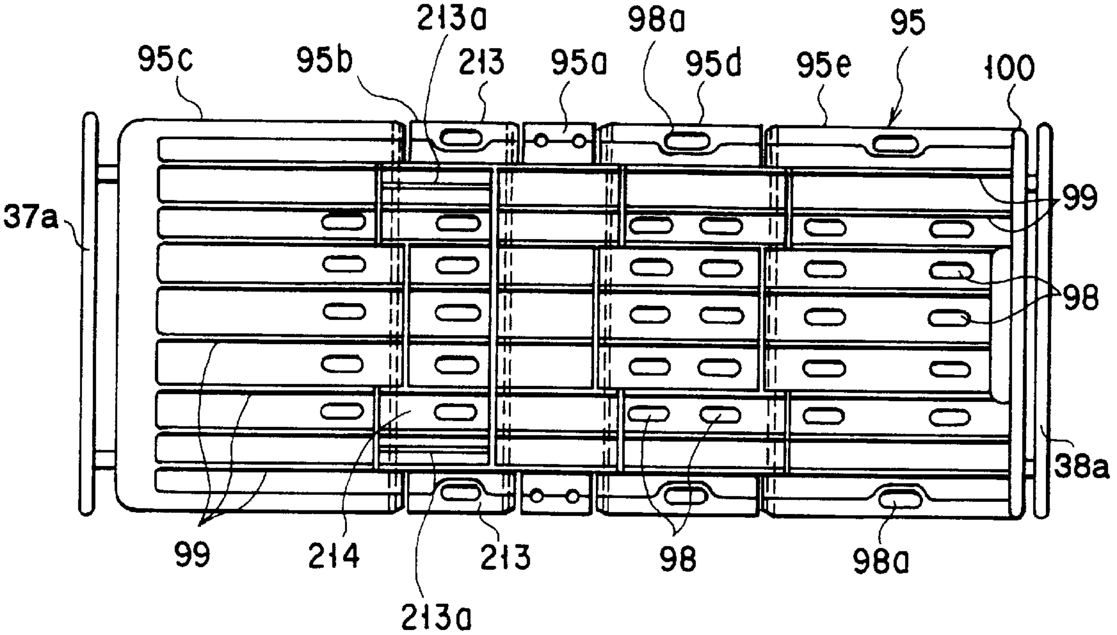
FIG. 20 is a plan view showing a bed apparatus according to a second embodiment of the present invention.
Figure 21:
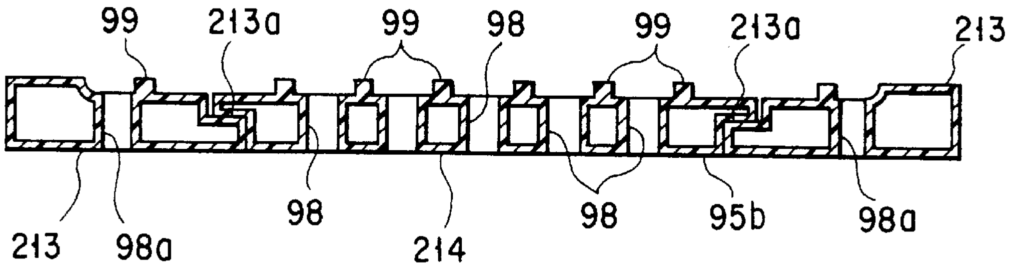
FIG. 21 is a cross sectional view showing a hip plate portion formed in the widthwise direction of the base plate portion.

On the other hand, the hip plate portion 95*b* of the base plate 95 is, as shown in FIGS. 20 and 21, composed of a pair of side portions 213 having a stepped portion 213*a* on the inside thereof and a hip raising member 214 disposed between the side portions 213 and having two widthwise ends which are engaged to the stepped portion 213*a*. The pair of the side portions 213 are rotatively connected to the side portions of the back plate portion 95*c*. One side of the hip raising member 214 is rotatively connected to one side of the back plate portion 95*c*. Therefore, the hip raising member 214 is able to be rotated upwards relative to an end thereof connected to the back plate portion 95*c*.

Figure 23A:
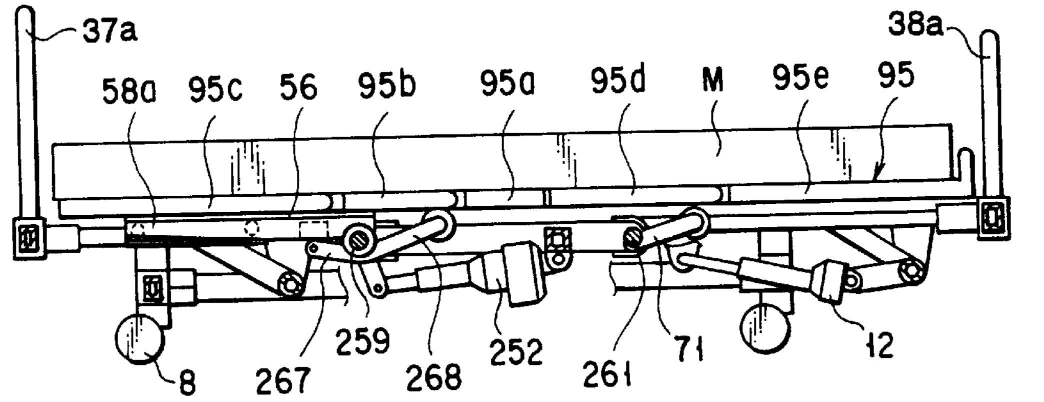
FIG. 23A is front view showing a state where the base plate is not raised.
Figure 23B:
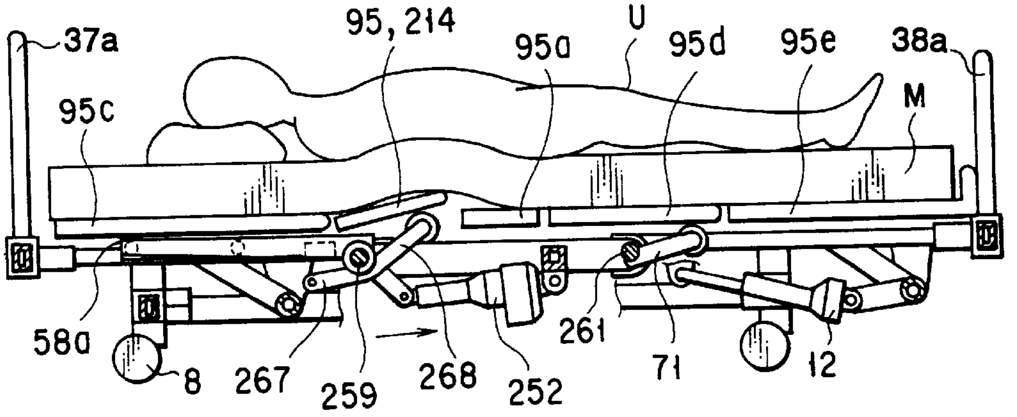
FIG. 23B is a front view showing a state where the hip raising member provided for the hip plate of the base plate is raised.

A first push-up roller 270 provided for the leading end of the hip raising arm 268 of the back elevating mechanism 51 is, as shown in FIGS. 23A and 23B, placed to oppose the lower surface of the hip raising member 214. Therefore, when a first rotational shaft 259 of the back elevating mechanism 51 is rotated clockwise which is the opposite direction to the counterclockwise direction indicated by an arrow shown in FIG. 22A, only the hip raising member 214 of the hip plate portion 95*b* is rotated in the raising direction.

The operation of the bed apparatus having the above-mentioned structure will now be described.

In a case where the upper half of the body of the user is raised, the back elevating mechanism 51 provided for the elevating frame 31 is operated. That is, the power source 252 for the back elevating mechanism 51 is operated so that the first rotational shaft 259 is rotated counterclockwise. As a result, the synchronous arm 267 is rotated in the raising direction so that the through hole 64 is rotated in the raising direction by the pin 269 provided for the synchronous arm 267.

Since the receiving roller 58 provided for the first raising arm 56 is engaged to the rail 58*a* provided for the lower surface of the back plate portion 95*c*, the back plate portion 95*c* is pushed upwards. Therefore, the upper half of the body of the user positioned on the back plate portion 95*c* can be raised.

Figure 23C:
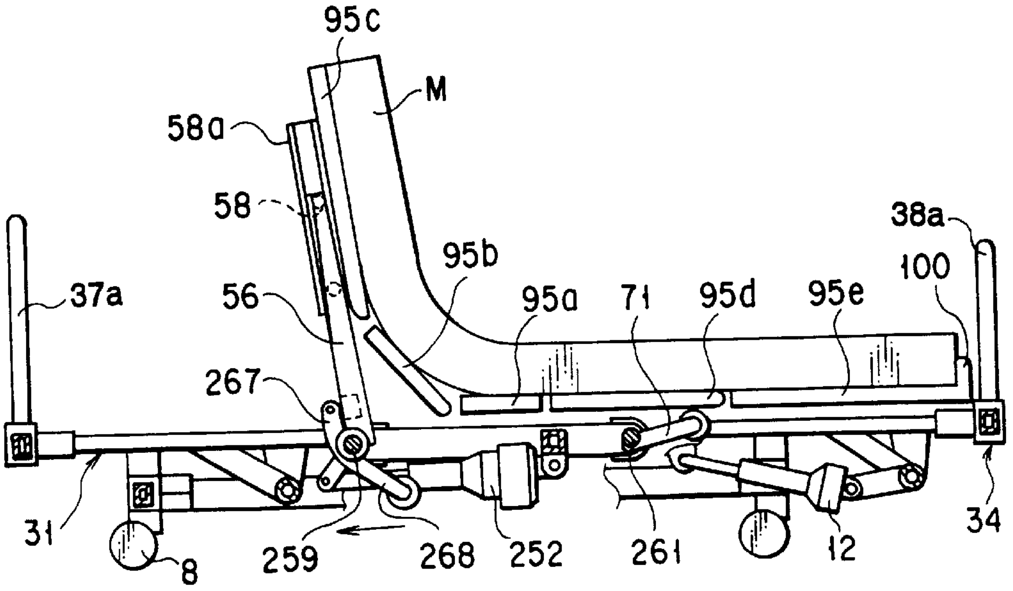
FIG. 23C is a front view showing a state where the back portion is raised.

The rotation of the first rotational shaft 54 can be transmitted to the second rotational shaft 55 by the power switch mechanism 61 and transmission can be interrupted by the same. In the case where the rotation of the first rotational shaft 54 is not transmitted to the second rotational shaft 55, the first leg plate portion 95*d* and the second leg plate portion 95*e* are not rotated and the flat state is maintained even if the back plate portion 95*c* is raised as shown in FIG. 23C. As a result, in a case of a user U who cannot move the leg, the bed apparatus can be used in such a manner that the rotation of the first rotational shaft 54 is not transmitted to the second rotational shaft 55 when the base plate portion is raised.

In order to prevent bed sores of the user U, a state where the rotation of the first rotational shaft 54 is not transmitted to the second rotational shaft 55 by the power switch mechanism 61 is realized. Moreover, each base plate portion of the base plate 95 is flattened, and then the drive shaft 253 of the back elevating mechanism 51 is moved rearwards. Since the first rotational shaft 54 is therefore rotated clockwise, the rotation of the first rotational shaft 54 results in the hip raising arm 268 being rotated in the raising direction, as shown in FIG. 23B. As a result, the synchronous arm 267 is rotated downwards.

When the hip raising arm 268 is rotated upwards, the hip raising member 214 of the hip plate portion 95*b* is rotated in the raising direction by the first push-up roller 270 provided for the leading end of the hip raising arm 268. As a result, the hip raising member 214 pushes upwards the hip of the user U on the mattress M.

When the hip of the user U is pushed upwards, pressure of the user U against the mattress M can be lowered. In particular, the pressure for the portion of the sacrum bone of the hip which easily encounters bed sores can considerably be lowered. Secondarily, pressure for the back and the heel can be lowered.

Accordingly, a structure in which the hip raising member 214 is raised at predetermined intervals when the back plate portion 95*c* is not raised enables bed sore of the user U to be prevented.

In a case where user U cannot discharge unaided and has a diaper, upward pushing of the hip of the user U by the hip raising member 214 facilitates change of the diaper.

When the first rotational shaft 54 is rotated clockwise to raise the hip raising member 214 of the hip plate portion 95*b*, also the synchronous arm 267 for raising the internal edge portion 96*c* through the first raising arm 56 is rotated clockwise.

Since the pin 269 provided for the synchronous arm 267 is simply engaged to the lower surface of the receiving member 266 provided for the first raising arm 56, the raising arm 56 is not affected even if the synchronous arm 267 is rotated clockwise.

That is, when the back elevating mechanism 51 is used to raise the hip raising member 214, the internal edge portion 96*c* substantially horizontally supported by the elevating frame 31 is not raised or moved downwards but only the hip raising member 214 can be raised. Therefore, the hip of the user U can reliably be raised by the hip raising member 214 so that pressure of the body of the user U against the mattress M is lowered.

Since the hip raising member 214 can be raised or lowered by the back elevating mechanism 51, a drive mechanism for only this operation can be omitted from the structure. That is, the hip raising member 214 can be raised and lowered without a complicated structure.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A reclining type bed apparatus capable of raising the upper half of the body of a user, comprising:

a bed frame;

a base plate divided into a fixed base plate portion, a hip plate portion, a back plate portion and leg plate portions, and structured such that said fixed base plate portion is secured to said bed frame, wherein said hip plate portion and said back plate portion are sequentially and rotatively connected to one side of said fixed base plate portion and said leg plate portions are rotatively connected to another side of said fixed base plate portion;

a back elevating mechanism for synchronously moving said hip plate portion by raising or lowering said back plate portion so that said back plate portion is raised at an angle bent forwards in the raising direction larger than an angle of said hip plate portion by raising said back plate portion, and for raising and lowering said leg plate portions when power of said back elevating mechanism has been transmitted, said back elevating mechanism having a second rotational shaft provided with a second raising arm for upwardly pushing said leg plate portions; and a power switch mechanism for transmitting the power of said back elevating mechanism and interrupting the transmission, positioned between said back elevating mechanism and said leg plate portions, said power switch mechanism has a first link having an end connected to a rotational shaft which is rotated by a drive source and arranged to be moved reciprocatively when said first rotational shaft is rotated, a second link having an end rotatively connected to said rotational shaft and operation means for establishing the connection between another end of said first link and another end of said second link and arranged to transmit or interrupt the movement of said first link to said second link caused by the rotation of said rotational shaft.

2. A bed apparatus according to claim 1, wherein said back elevating mechanism has a drive source, a rotational shaft which is rotated by said drive source, a guide rail disposed on the lower surface of said back plate portion along the lengthwise direction of said bed frame, an arm having an end connection to a drive shaft and arranged to be rotated together with said drive shaft, and a plurality of rollers rotatively provided for another end of said arm and rotatively engaged to said guide rail so as to raise said back plate portion in a connection portion with said hip plate portion through said guide rail while bending the connection portion when said arm is moved in the raising direction.

3. A bed apparatus according to claim 1, wherein projection and recess connection portions arranged to be engaged to each other are formed in the end portions of rotative connection portions of at least said fixed base plate portion, and wherein said hip plate portion and said back plate portion of said base plate portions of said base plate and said connection portions are rotatively connected to each other by a connection shaft.

4. A bed apparatus according to claim 1, wherein projection lines running in the lengthwise direction of said bed frame are formed on the top surface of each of said base plate portions of said base plate.

5. A bed apparatus according to claim 1, wherein each of said base plate portions is made of synthetic resin in the form of a hollow shape, and provided with projection lines running in the lengthwise direction of said bed frame and formed on the top surface thereof and a reinforcing member for preventing deformation on the inside thereof.

6. A bed apparatus according to claim 1, wherein an attaching portion, into which a holding member for rotatively connecting said leg plate portion and said bed frame to each other is forcibly inserted, is integrally formed with the lower surface of said leg plate portion disposed adjacent to the leg portion of a user.

7. A bed apparatus according to claim 1, wherein at least one of said base plate portions is provided with an attaching hole formed integrally for attaching a restraining belt for restraining movement of a user on said elevating frame.

8. A reclining type bed apparatus capable of raising the upper half of the body of a user, comprising:

a bed frame;

a base plate divided into a fixed base plate portion, a hip plate portion, a back plate portion and leg plate portions and structured such that said fixed base plate portion is secured to said bed frame, said hip plate portion and said back plate portion are sequentially and rotatively connected to one side of said fixed base plate portion and said leg plate portions are rotatively connected to another side of said fixed base plate portion; and a back elevating mechanism for synchronously moving said hip plate portion by raising or lowering said back plate portion so that said back plate portion is raised at an angle bent forwards in the raising direction larger than an angle of said hip plate portion by raising said back plate portion, wherein said hip plate portion has a hip raising member provided rotatively in the raising direction, and said hip raising member is moved in the raising direction by raising means which is moved by said back elevating mechanism, wherein said back elevating mechanism has a power source, a drive shaft which is rotated by said power source and a raising arm provided for said drive shaft and arranged to raise or lower said back plate portion in synchronization with rotation of said drive shaft, and said raising means has a hip raising arm provided for said drive shaft and arranged to be brought into contact with the lower surface of said hip raising member to raise said hip raising member when said drive shaft has been rotated in a direction opposite to a direction in which said back plate portion is raised, and wherein an end of said raising arm is rotatively provided for said drive shaft, said drive shaft is provided with a synchronous arm which is engaged in only a direction in which said raising arm is raised, and said back plate portion is raised when said synchronous arm is rotated in a direction in which said synchronous arm is engaged to said raising arm.

9. A bed apparatus according to claim 8, wherein said back elevating mechanism has a drive source, a rotational shaft which is rotated by said drive source, a guide rail disposed on the lower surface of said back plate portion along the lengthwise direction of said bed frame, an arm having an end connected to said drive shaft and arranged to be rotated together with said drive shaft, and a plurality of rollers rotatively provided for another end of said arm and rotatively engaged to said guide rail so as to raise said back plate portion in a connection portion with said hip plate portion through said guide rail while bending the connection portion when said arm is moved in the raising direction.

10. A bed apparatus according to claim 8, wherein projection and recess connection portions arranged to be engaged to each other are formed in the end portions of rotative connection portions of at least said fixed base plate portion, and wherein said hip plate portion and said back plate portion of said base plate portions of said base plate and said connection portions are rotatively connected to each other by a connection shaft.

11. A bed apparatus according to claim 8, wherein projection lines running in the lengthwise direction of said bed frame are formed on the top surface of each of said base plate portions of said base plate.

12. A bed apparatus according to claim 8, wherein each of said base plate portions is made of synthetic resin in the form of a hollow shape, and provided with projection lines running in the lengthwise direction of said bed frame and formed on the top surface thereof and a reinforcing member for preventing deformation on the inside thereof.

13. A bed apparatus according to claim 8, wherein an attaching portion, into which a holding member for rotatively connecting said leg plate portion and said bed frame to each other is forcibly inserted, is integrally formed with the lower surface of said leg plate portion disposed adjacent to the leg portion of a user.

14. A bed apparatus according to claim 8, wherein at least one of said base plate portions is provided with an attaching hole formed integrally for attaching a restraining belt for restraining movement of a user on said elevating frame.

15. A bed apparatus comprising:

a base frame;

an elevating frame vertically movable by an elevation mechanism provided on said base frame, and having longitudinal end portions at which board bodies are upright; and a base plate provided on said elevating frame, wherein said elevating frame comprises four rod members located to form a rectangle; and connection members comprising first insertion portions, second insertion portions, and holding portions, the first and second insertion portions and the holding portion of each of said connection member being formed integral with each other, the first insertion portion of said each of said connection member being designed to hold an end of an associated one of the rod members, with the end of said associated one of the rod members inserted in the first insertion portion, the second insertion portion of said each of said connection members being designed to hold an end of an associated one of the rod members, with the end of said associated one of the rod members inserted in the second insertion portion, the holding portions of said connection members being designed to hold the board bodies such that the board bodies are upright at the longitudinal ends of said elevating frame.

16. A bed apparatus according to claim 15, wherein said elevation mechanism has arms each having an end rotatively connected to said elevating frame, and wherein said base frame has four rod members disposed in a rectangular frame shape and a connection member formed by integrating a first insertion portion into which an end of one of two adjacent rod members is inserted and secured and a second insertion portion into which an end of a residual rod member is inserted and secured; and wherein an attaching portion, to which another end of said arms is rotatively attached, is integrally formed with said first connection member.

17. A bed apparatus according to claim 16, wherein said first connection member provided for said base frame has an attaching portion for holding said base frame in such a manner that said base frame can be moved.

18. A bed apparatus according to claim 15, wherein said rod member disposed on the side of said elevating frame has a holding member having an end attached to said rod member and another end projecting outwards in the widthwise direction of said elevating frame and bent downwards, and a holding portion for holding a lower end of a side frame having an inwardly bent section near the lower portion thereof said holding member.

19. A bed apparatus according to claim 18, wherein said holding member is divided into an upper member and a lower member having ends rotatively connected to each other, and recess holding members for holding said rod member are formed between connection surfaces of said upper member and said lower member.

* * * * *